United States Patent
Saito et al.

(10) Patent No.: US 7,383,341 B1
(45) Date of Patent: Jun. 3, 2008

(54) DATA TRANSFER CONTROL DEVICE, RELAY DEVICE AND CONTROL DEVICE SUITABLE FOR HOME NETWORK ENVIRONMENT

(75) Inventors: Takeshi Saito, Tokyo (JP); Yoshiaki Takabatake, Kanagawa (JP); Mikio Hashimoto, Chiba (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 60 days.

(21) Appl. No.: 09/035,995

(22) Filed: Mar. 6, 1998

Related U.S. Application Data

(63) Continuation-in-part of application No. 08/950,143, filed on Oct. 14, 1997, now abandoned.

(30) Foreign Application Priority Data

| Oct. 15, 1996 | (JP) | ............................... P08-272672 |
| Mar. 6, 1997 | (JP) | ............................... P09-052125 |
| Feb. 2, 1998 | (JP) | ............................... P10-020905 |

(51) Int. Cl.
*G06F 15/16* (2006.01)

(52) U.S. Cl. ...................................... 709/228; 709/229

(58) Field of Classification Search ................ 709/220, 709/222, 223, 225, 230, 232, 233, 238, 224, 709/228, 229; 370/465, 466, 467; 376/471; 725/116, 146, 153

See application file for complete search history.

(56) References Cited

U.S. PATENT DOCUMENTS 5,208,811 A * 5/1993 Kashio et al. ............. 370/94.1
5,224,098 A * 6/1993 Bird et al.
5,303,344 A * 4/1994 Yokoyama et al.

(Continued)

FOREIGN PATENT DOCUMENTS

JP 63-286035 11/1988

(Continued)

OTHER PUBLICATIONS

Takeshi Saito, et al., "Internetworking Methodology Using ATM Networks", Technical Report of IEICE, vol. 94, No. 4, Apr. 6, 1994, pp. 49-54 (with English Abstract).

(Continued)

*Primary Examiner*—Larry D. Donaghue
(74) *Attorney, Agent, or Firm*—Oblon, Spivak, McClelland, Maier & Neustadt, P.C.

(57) ABSTRACT

A data transfer control device and a relay device which are suitable for use in the home network environment. For a case of controlling transfer of information data to a receiving node connected with a first physical network from a transmitting node connected with a second physical network, there is provided a data transfer control device connected with the second physical network which has: an establishing unit for establishing a channel in the second physical network for transmitting the information data; a reserving unit for reserving a communication path for transferring the information data transmitted through that channel to another data transfer control device belonging to the first physical network and/or the receiving node; and a commanding unit for commanding the transmitting node to transmit the information data through that channel, by using a protocol depending on the second physical network.

11 Claims, 31 Drawing Sheets

U.S. PATENT DOCUMENTS

| | | | |
|---|---|---|---|
| 5,452,291 A * | 9/1995 | Eisenhandler et al. | |
| 5,473,608 A * | 12/1995 | Gagne et al. | 370/85.13 |
| 5,491,693 A * | 2/1996 | Britton et al. | |
| 5,515,508 A * | 5/1996 | Pettus et al. | |
| 5,524,253 A * | 6/1996 | Pham et al. | 395/800 |
| 5,530,842 A * | 6/1996 | Abraham et al. | 395/500 |
| 5,555,244 A | 9/1996 | Gupta et al. | |
| 5,557,748 A * | 9/1996 | Norris | |
| 5,608,874 A * | 3/1997 | Ogawa et al. | 395/200.15 |
| 5,623,605 A * | 4/1997 | Keshav et al. | 395/200.17 |
| 5,640,394 A * | 6/1997 | Schrier et al. | |
| 5,673,322 A * | 9/1997 | Pepe et al. | |
| 5,706,434 A * | 1/1998 | Kremen et al. | |
| 5,710,908 A * | 1/1998 | Man | 395/500 |
| 5,729,685 A * | 3/1998 | Chatwani et al. | 709/224 |
| 5,732,086 A * | 3/1998 | Liang et al. | 370/410 |
| 5,734,824 A * | 3/1998 | Choi | 709/224 |
| 5,774,698 A * | 6/1998 | Olnowich | 395/500 |
| 5,784,450 A * | 7/1998 | Stahl | 379/221.09 |
| 5,796,736 A * | 8/1998 | Suzuki | 370/254 |
| 5,801,942 A * | 9/1998 | Nixon et al. | |
| 5,845,081 A * | 12/1998 | Rangarajan et al. | 395/200.54 |
| 5,862,481 A * | 1/1999 | Kulkarni et al. | 455/432 |
| 5,886,643 A * | 3/1999 | Diebboll et al. | 709/224 |
| 5,918,016 A * | 6/1999 | Brewer et al. | 709/220 |
| 5,920,565 A * | 7/1999 | Cullen | 370/401 |
| 6,064,772 A | 5/2000 | Tanno et al. | |
| 6,100,883 A * | 8/2000 | Hoarty | |
| 6,118,782 A * | 9/2000 | Dixon et al. | 370/389 |
| 6,119,167 A * | 9/2000 | Boyle et al. | |
| 6,182,094 B1 * | 1/2001 | Humpleman et al. | |
| 6,188,397 B1 * | 2/2001 | Humpleman | |
| 6,198,479 B1 * | 3/2001 | Humpleman | |
| 6,243,707 B1 * | 6/2001 | Humpleman et al. | |
| 6,243,783 B1 * | 6/2001 | Smyers et al. | 710/310 |
| 6,255,999 B1 * | 7/2001 | Faulkner et al. | |
| 6,266,694 B1 * | 7/2001 | Duguay et al. | |
| 6,288,716 B1 * | 9/2001 | Humpleman et al. | |
| 6,332,159 B1 * | 12/2001 | Hatae et al. | 709/224 |
| 6,466,971 B1 * | 10/2002 | Humpleman et al. | 709/220 |
| 6,600,733 B2 * | 7/2003 | Deng | 370/352 |

FOREIGN PATENT DOCUMENTS

| | | |
|---|---|---|
| JP | 7-162968 | 6/1995 |
| JP | 7-202908 | 8/1995 |
| JP | 7-336642 | 12/1995 |
| JP | 8-223224 | 8/1996 |
| JP | 8-256153 | 10/1996 |
| JP | 8-265372 | 10/1996 |
| JP | 8-511402 | 11/1996 |
| WO | WO 95/27357 | 10/1995 |

OTHER PUBLICATIONS

H. K. Pung, et al., "A TCP/IP-X.25 Gateway to Teleview", Singapore ICCS '94 Conference Proceedings, Singapore Nov. 14-18, 1994, pp. 1164-1168.

* cited by examiner

FIG.3

| 1394 SIDE INPUT CHANNEL NO. OR 1394 DESTINATION ADDRESS INCLUDING REGISTER OFFSET VALUE | ATTRIBUTE | OUTPUT PORT | ATM OUTPUT VPI/VCI |
|---|---|---|---|
| #1 | MPEG, 4M | B | #A |
| #4 | AUDIO, 1M | B | #B |

FIG.4

| ATM INPUT VPI/VCI | ATTRIBUTE | OUTPUT PORT | 1394 SIDE OUTPUT CHANNEL NO. OR 1394 DESTINATION ADDRESS INCLUDING REGISTER OFFSET VALUE |
|---|---|---|---|
| #A | MPEG, 4M | B | #1 |
| #B | AUDIO, 1M | B | #3 |

FIG.6

| IP ADDRESSES OF OTHER AV CONTROL TERMINALS | ATTRIBUTE INFORMATION FOR DATA/AV DEVICES UNDER CONTROL OF THIS AV CONTROL TERMINAL | | |
|---|---|---|---|
| | NETWORK TYPE | ADDRESS | ATTRIBUTE |
| IP ADDRESSES OF 1ST AV CONTROL TERMINAL | 1394 | 1394 ADDRESS OF TRANSMITTING TERMINAL 1 | DVD PLAYER |
| | ... | ... | ... |
| IP ADDRESSES OF 3RD AV CONTROL TERMINAL | | | |

DATA TRANSFER CONTROL DEVICE, RELAY DEVICE AND CONTROL DEVICE SUITABLE FOR HOME NETWORK ENVIRONMENT

This is a continuation-in-part application, commonly assigned application Ser. No. 08/950,143 filed Oct. 14, 1997, which is now abandoned.

BACKGROUND OF THE INVENTION

1. Field of the Invention

The present invention relates to a network system for constructing a home network environment, and more particularly, to a data transfer control device, a relay device, and a control device suitable for use in the home network environment.

2. Description of the Background Art

In recent years, there is a rapid trend for digitalizing electronic instruments as exemplified by the term "multi-media", and this trend is already noticeable in the office environment.

More specifically, in terms of hardware, this trend has been materialized in forms of introduction of PCs, digitalization of OA devices and formation of networks among them. Also, in terms of software, this trend has been expanding to cover the basic functions of hosts (which are progressively light-sized and transferred to PCs), the application software such as the word-processing software, the spreadsheet software, etc., and the Internet application such as the WWW.

The similar trend can also be seen in the home environment. Namely, even in the home environment, this trend for digitalization has been steadily progressed in forms of digitalization of AV devices (DVD, digital VTR, digital video camera, etc.), digitalization of broadcasting, and Internet access such as OCN.

Similarly as in a case of the office environment, this trend is expected to progress toward the formation of networks in future. Namely, it is expected that the technologies of various fields such as information processing, communication and broadcasting will be unified by the digitalization, and inter-mixed with each other by the formation of networks.

There are many candidates for the network technologies in this direction. For example, the Ethernet has overwhelming records of the actual use in the office environment and is probably the most promising candidate even for the home PC network. Also, the ATM is another serious contender because of the general consensus among the infra-structure constructors (telephone companies, CATV companies, etc.) to keep constructing the infra-structures based on this technology in view of the advantageous characteristics of the ATM such as its fast, real-time, and wide bandwidth properties.

In addition to these candidates, the network technology (bus technology) called IEEE 1394 has been attracting much attention recently. This IEEE 1394 has several remarkable characteristics such as its fast, real-time (QOS guaranteed), and plug-and-play properties, so that there is a high expectation especially among the AV industries on the IEEE 1394 as the most promising candidate for a future scheme for inter-connecting digital AV devices. This vogue has also instigated much interests to the IEEE 1394 from the computer industries as well.

In the initial phase, it is expected that the inter-connection of the home use digital devices will be realized by these various network technologies in conjunction with the spread of the home use digital devices, depending on preferences and demands of the users, and in this way prototype digital networks will be gradually built up inside each home.

In the second phase, there will be demands for inter-connecting these digital networks together. For example, there will be a desire to inter-connect an AV device connected to the 1394 network of a guest room on the first floor with another AV device connected to the 1394 network of a private room on the second floor in order to realize the dubbing or the cooperative operation between these AV devices.

However, in order to meet the expected demands of this second phase, the following problems must be addressed and resolved.

For now, it is highly likely that many AV devices will appear as dedicated 1394 terminals. This is because the infra-structures such as the Internet and B-ISDN are not yet fully developed so far so that it is presently rather difficult to develop any AV device that presupposes the availability of these infra-structures.

On the other hand, as these infra-structures come to be fully developed, it is expected that AV devices compatible with the Internet or B-ISDN will appear, but then it would be difficult to inter-connect such AV devices with the by then existing dedicated 1394 terminals. In addition, in such a case, only those terminals which are connected to the same 1394 as the dedicated 1394 AV devices would be capable of exchanging AV data and it would be impossible to exchange data with nodes which are connected to networks other than 1394 or nodes which are far distanced.

SUMMARY OF THE INVENTION

It is therefore an object of the present invention to provide a data transfer control device, a relay device, and a control device which are capable of resolving the above noted problems and which are therefore suitable for use in the home network environment.

According to one aspect of the present invention, there is provided a relay device for transmitting and receiving contents between at least one terminal device connected to a first network and at least one terminal device connected to a second network, the relay device being connected to the first network and the second network and comprising: a first collection unit configured to collect an address and attribute information of each terminal device connected to the first network, by inquiring at least one of a type of the each terminal device and the contents possessed by the each terminal device, and the attribute information containing the address of the each terminal device; a second collection unit configured to collect the address and the attribute information of each terminal device connected to the second network, by inquiring at least one of a type of the each terminal device and the contents possessed by the each terminal device, and the attribute information containing the address of the each terminal device; a memory unit configured to store the address and the attribute information of each terminal device on the first network and the second network collected by the first collection unit and the second collection unit; a display control unit configured to enable display of information stored in the memory unit; a first set up unit configured to set up a connection on the first network for transmitting contents to be transmitted from a transmitting terminal which is a terminal device on the first network to a receiving terminal which is a terminal device on the second network, upon receiving a request for transmission of the contents possessed by the transmitting terminal from the transmitting terminal to the receiving terminal, the transmitting terminal and the receiving terminal being selected according to the display of information enabled by the display control unit; a second set up unit configured to set up a channel on the second network for transmitting the contents to be transmitted from the transmitting terminal; a reception unit configured to receive the contents transmitted from the transmitting terminal by using the connection; and a transmission unit configured to transmit the contents received by the reception unit to the receiving terminal by using the channel.

According to another aspect of the present invention, there is provided a method for controlling a relay device for transmitting and receiving contents between at least one terminal device connected to a first network and at least one terminal device connected to a second network, the relay device being connected to the first network and the second network and the method comprising: collecting an address and attribute information of each terminal device connected to the first network, by inquiring at least one of a type of the each terminal device and the contents possessed by the each terminal device, and the attribute information containing the address of the each terminal device; collecting the address and the attribute information of each terminal device connected to the second network, by inquiring at least one of a type of the each terminal device and the contents possessed by the each terminal device, and the attribute information containing the address of the each terminal device; storing the address and the attribute information of each terminal device on the first network and the second network collected by the collecting steps in a memory; enabling display of information stored in the memory; setting up a connection on the first network for transmitting contents to be transmitted from a transmitting terminal which is a terminal device on the first network to a receiving terminal which is a terminal device on the second network, upon receiving a request for transmission of the contents possessed by the transmitting terminal from the transmitting terminal to the receiving terminal, the transmitting terminal and the receiving terminal being selected according to the display of information enabled by the enabling step; setting up a channel on the second network for transmitting the contents to be transmitted from the transmitting terminal; receiving the contents transmitted from the transmitting terminal by using the connection, and transmitting the contents received by the receiving step to the receiving terminal by using the channel.

According to one aspect of the present invention, there is provided a data transfer control device for controlling transfer of information data to a receiving node connected with a first physical network from a transmitting node connected with a second physical network, the data transfer control device being connected with the second physical network and comprising: an establishing unit for establishing a channel in the second physical network for transmitting the information data; a reserving unit for reserving a communication path for transferring the information data transmitted through said channel to another data transfer control device belonging to the first physical network and/or the receiving node; and a commanding unit for commanding the transmitting node to transmit the information data through said channel, by using a protocol depending on the second physical network.

In this aspect of the present invention, it becomes possible to carry out the data transfer to the receiving node, even when the transmitting node connected to the second physical network only supports a protocol depending on the second physical network, regardless of the inter-connected network environment (link layer protocol) up to the receiving node.

Namely, the data can be transmitted to the receiving node as the transmission node is urged by using a protocol depending on the second physical network to carry out the data transmission to said channel of the second physical network as a result of operations by the establishing unit and the command unit with respect to the communication path reserved by the reserving unit. Said channel of the second physical network may be contained in said communication path, or the data received from said channel of the second physical network may be transferred to said communication path by the data transfer control device.

Also, in this aspect of the present invention, the receiving unit may transmit a control message commanding a network connection device which connects the second physical network and a third physical network, to register a correspondence between the channel in the second physical network and a header/channel information depending on the third physical network.

In this case, it becomes possible to make a neighboring connection device to inter-connect the second physical network and the third physical network at the link layer level. This implies that this inter-connection can be realized by using the link layer switch at said connection device, which in turn implies that it becomes possible to realize a high speed and low cost inter-connection.

Also, in this aspect of the present invention, the reserving unit may transmit a control message containing an address information for said another data transfer control device and/or the receiving node and at least one of a header information to be attached to the information data and an information regarding a channel through which the information data is to be transferred, to said another data transfer control device and/or the receiving node.

By means of this control message, a connection device that received this message can obtain a direction of a communication path to be reserved and a transfer channel in the previous hop link, and the entire communication path can be reserved by repeating this operation, so that it becomes possible to reserve the communication path reaching to said another data transfer control device belonging to the first physical network or the receiving node.

Also, in this aspect of the present invention, the data transfer control device may be further comprising: an interface unit for connecting the data transfer control device to a third physical network or the first physical network; and a transmission unit for transmitting the information data received through said channel in the second physical network to the third physical network or the first physical network, onto a channel indicated by said control message, or after attaching the header information contained in said control message.

In this case, when an inter-network connection device of the second physical network that makes an inter-network connection to a route reaching to the receiving node and the data transfer control device are the same device, it becomes possible for this device to flow the data from the transmitting node into said communication path, so that it becomes possible to realize the data transfer from the transmitting node to the receiving node.

Also, in this aspect of the present invention, the data transfer control device may be further comprising: an interface unit for connecting the data transfer control device to a third physical network or the first physical network; a conversion unit for converting a data format of data received through said channel, from a first data format depending on the second physical network to a second data format depending on the third physical network or the first physical network and/or an upper logical network of the third physical network or the first physical network; and a transmission unit for transmitting said data with the data format converted by the conversion unit as the information data to the third physical network or the first physical network, onto a channel indicated by said control message, or after attaching the header information contained in said control message.

In this case, it becomes possible to carry out the transfer format conversion in a case where the transfer format in the communication path from the transmitting node to the data transfer control device is different from the transfer format in the communication path from the data transfer control device to the receiving node. By means of this, it becomes possible for the data transfer control device to absorb the difference between the transfer format such as MPEG which is depending on the specific link layer technology such as ATM network or IEEE 1394 and the transfer format depending on the specific logical network such as MPEG-over-IP, etc., for example.

Also, in this aspect of the present invention, the data transfer control device may be further comprising: an encoding/decoding unit for encoding/decoding data received through said channel; and a transmission unit for transmitting the information data encoded/decoded by the encoding/decoding unit, to a channel indicated by said control message, or after attaching a header information contained in said control message.

In this case, it becomes possible to carry out a conversion of the bandwidth to be used in a case where the available bandwidth in the communication path from the transmitting node to the data transfer control device is different from the available bandwidth in the communication path from the data transfer control device to the receiving node.

Also, in this aspect of the present invention, the establishing unit may establish said channel in a form of a broadcast type channel.

In this case, as the channel established by the establishing unit is the broadcast type channel, when an inter-network connection device of the second physical network that makes an inter-network connection to a route reaching to the receiving node and the data transfer control device are different devices, it becomes unnecessary to establish two paths including a communication path between the transmitting node and the data transfer control device and a communication path between the data transfer control device and said inter-network connection device. Namely, it suffices to establish this broadcast type channel alone, so that the efficient network resource utilization can be realized.

Also, in this aspect of the present invention, the reserving unit may communicate an information regarding a communication resource required for the communication path, with said another data transfer control device and/or the receiving node.

In this case, it is possible to provide a control message including an information regarding the communication resource amount necessary in establishing a route at a time of transmitting the information data to the receiving node, so that it becomes possible to establish the communication path with the so called QOS (Quality Of Service) which is accompanied by the communication resource amount such as a necessary bandwidth or a tolerable packet arrival delay, at a time of reserving a communication path reaching to said another data transfer control device belonging to the first physical network or the receiving node.

Also, in this aspect of the present invention, the data transfer control device may be further comprising: a collecting unit for collecting attribute information of transmitting and/or receiving nodes connected with the second physical network; and a notifying unit for notifying said attribute information to said another data transfer control device and/or the receiving node.

In this case, regardless of a type of the second physical network, it becomes possible to notify the information on the configuration of the second physical network to said another data transfer control device or the receiving node. Consequently, it becomes possible for said another data transfer control device or the receiving node to have various information regarding the information devices connected to a remote physical network including an information about devices which are operated by a protocol depending on the second physical network, so that it becomes possible to specify the transmitting node from these devices.

Also, in this aspect of the present invention, the data transfer control device many be further comprising: a receiving unit for receiving a notice regarding attribute information of transmitting and/or receiving nodes connected with the first physical network; and a memory unit for storing said attribute information.

In this case, it becomes possible to obtain various information regarding the information devices connected to a physical network to which said another data transfer control device is connected, so that it becomes possible to specify an arbitrary node among these devices as the receiving node.

Also, in this aspect of the present invention, the data transfer control device may be further comprising: a receiving unit for receiving a control message containing an information capable of specifying the transmitting node, from said another data transfer control device and/or the receiving node; wherein the commanding unit commands a transmission of the information data to the transmitting node which is specified by said control message.

In this case, it becomes possible to carry out the data transfer with respect to said another data transfer control device or the receiving node from the transmitting node specified from said another data transfer control device or the receiving node. Namely, it becomes possible for said another data transfer control device or the receiving node to specify the transmitting node, even in a case where the transmitting node is a node operated by a protocol depending on the second physical network and not supporting a protocol between the data transfer control devices.

Also, in this aspect of the present invention, the reserving unit may transmit a control message containing an information capable of specifying the receiving node, to said another data transfer control device.

In this case, it becomes possible to explicitly specify the receiving node which is to be the data transfer destination to said another data transfer control device, even in a case where the receiving node is a node operated by a protocol depending on the first physical network and not supporting a protocol between the data transfer control devices, so that it becomes possible to realize the data transfer from the transmitting node to the receiving node regardless of a protocol type of the receiving node.

According to another aspect of the present invention, there is provided a data transfer control device for controlling transfer of information data to a receiving node connected with a first physical network from a transmitting node connected with a second physical network, the data transfer control device being connected with the first physical network and comprising: a receiving unit for receiving a control message to be used in reserving a communication path reaching the data transfer control device, said control message containing at least one of a header information to be attached to the information data in the first physical network, and an information regarding a channel through which the information data is to be transferred; and a commanding unit for commanding the receiving node to receive the information data which has the header information contained in said control message or which is transferred through the channel indicated by said control message, by using a protocol depending on the first physical network.

In this aspect of the present invention, it becomes possible to realize the data transfer from the transmitting node, even when the receiving node connected to the first physical network only supports a protocol depending on the first physical network, regardless of the inter-connected network environment (link layer protocol) up to the transmitting node.

Namely, the communication path reaching to another data transfer control device belonging to the second physical network or the transmitting node can be reserved by the control message received by the receiving unit. In addition, the receiving node is urged by using a protocol depending on the first physical network to carry out the data reception from the channel of the first physical network as a result of operation by the commanding unit, so that it becomes possible to realize the data transfer from the transmitting node to the receiving node regardless of a type of the first physical network.

Also, in this aspect of the present invention, said control message may indicate the channel of the first physical network in a form of a broadcast type channel.

In this case, when an inter-network connection device of the first physical network that makes an inter-network connection to a route reaching to the transmitting node and the data transfer control device are different devices, it becomes unnecessary to establish two paths including a communication path between said inter-network connection device and the receiving node and a communication path between said inter-network connection device and the data transfer control device. Namely, it suffices to establish this broadcast type channel alone, so that the efficient network resource utilization can be realized. Also, when they are the same device, it becomes possible to specify a plurality of receiving nodes simultaneously.

Also, in this aspect of the present invention, said control message may also contain an information regarding a communication resource required in reserving the communication path.

In this case, it becomes possible for the data transfer control device to obtain a guidance as to what communication path accompanied by what communication resource amount should be established at a time of establishing a channel on the first physical network.

Also, in this aspect of the present invention, the data transfer control device may be further comprising: a collecting unit for collecting attribute information of transmitting and/or receiving nodes connected with the first physical network; and a notifying unit for notifying said attribute information to another data transfer control device belonging to the second physical network and/or the transmitting node.

In this case, regardless of a type of the first physical network, it becomes possible to notify the information on the configuration of the first physical network to said another data transfer control device or the transmitting node. Consequently, it becomes possible for said another data transfer control device or the transmitting node to have various information regarding the information devices connected to a remote physical network including an information about devices which are operated by a protocol depending on the first physical network, so that it becomes possible to specify the receiving node from these devices.

Also, in this aspect of the present invention, the data transfer control device may be further comprising: a notice receiving unit for receiving a notice regarding attribute information of transmitting and/or receiving nodes connected with the second physical network; and a memory unit for storing said attribute information.

In this case, it becomes possible to obtain various information regarding the information devices connected to a physical network to which said another data transfer control device is connected, so that it becomes possible to specify an arbitrary node among these devices as the transmitting node.

Also, in this aspect of the present invention, the data transfer control device may be further comprising: a message receiving unit for receiving a message containing an information capable of specifying the receiving node, from another data transfer control device belonging to the second physical network and/or the transmitting node; wherein the commanding unit commands a receiving of the information data to the receiving node which is specified by said message.

In this case, it becomes possible to realize the data transfer with respect to the receiving node specified from said another data transfer control device or the transmitting node. Namely, it becomes possible for said another data transfer control device or the transmitting node to clearly specify the receiving node.

Also, in this aspect of the present invention, the data transfer control device may be further comprising: a transmission unit for transmitting a message containing an information capable of specifying the transmitting node, to another data transfer control device belonging to the second physical network.

In this case, it becomes possible to explicitly specify the transmitting node which is to be the data transfer source to said another data transfer control device, even in a case where the transmitting node is a node operated by a protocol depending on the second physical network and not supporting a protocol between the data transfer control devices, so that it becomes possible to realize the data transfer from the transmitting node to the receiving node regardless of a protocol type of the transmitting node.

According to another aspect of the present invention, there is provided a data transfer control device for controlling transfer of information data to a receiving node connected with a first physical network from a transmitting node connected with a second physical network, the data transfer control device being connected with the first physical network and comprising: an establishing unit for establishing a channel in the first physical network; a transfer unit for transferring the information data transferred through a communication path that is reserved for receiving the information data transmitted from the transmitting node, to the channel established by the establishing unit; and a commanding unit for commanding the receiving node to receive the information data which is transferred through the channel established by the establishing unit, by using a protocol depending on the first physical network.

In this aspect of the present invention, it becomes possible to realize the data transfer from the transmitting node, even when the receiving node connected to the first physical network only supports a protocol depending on the first physical network, regardless of the inter-connected network environment (link layer protocol) up to the transmitting node.

Namely, the receiving node is urged by using a protocol depending on the first physical network to carry out the data reception from the channel of the first physical network as a result of operations by the establishing unit and the commanding unit with respect to the information data transferred by the reserved communication path, so that it becomes possible to transmit the data up to the receiving node.

Also, in this aspect of the present invention, said communication path may be reserved by receiving a control message containing at least one of a header information attached to the information data and an information regarding a channel through which the information data is to be transferred, from a physical network different from the first physical network.

By means of this control message, it becomes possible for the data transfer control device to recognize the receiving node which is the data transmission destination, and therefore the entire communication path can be reserved, so that it becomes possible to reserve the end-to-end communication from another data transfer control device belonging to the second physical network or the transmitting node.

Also, in this aspect of the present invention, said control message may also contain an information regarding a communication resource required in reserving the communication path.

In this case, it becomes possible for the data transfer control device to obtain a guidance as to what communication path accompanied by what communication resource amount should be established at a time of establishing a channel on the first physical network.

Also, in this aspect of the present invention, the establishing unit may establish the channel of the first physical network in a form of a broadcast type channel.

In this case, when an inter-network connection device of the first physical network that makes an inter-network connection to a route reaching to the transmitting node and the data transfer control device are different devices, it becomes unnecessary to establish two paths including a communication path between said inter-network connection device and the receiving node and a communication path between said inter-network connection device and the data transfer control device. Namely, it suffices to establish this broadcast type channel alone, so that the efficient network resource utilization can be realized. Also, when they are the same device, it becomes possible to specify a plurality of receiving nodes simultaneously.

Also, in this aspect of the present invention, the data transfer control device may be further comprising: a collecting unit for collecting attribute information of transmitting and/or receiving nodes connected with the first physical network; and a notifying unit for notifying said attribute information to another data transfer control device belonging to the second physical network and/or the transmitting node.

In this case, regardless of a type of the first physical network, it becomes possible to notify the information on the configuration of the first physical network to said another data transfer control device or the transmitting node. Consequently, it becomes possible for said another data transfer control device or the transmitting node to have various information regarding the information devices connected to a remote physical network including an information about devices which are operated by a protocol depending on the first physical network, so that it becomes possible to specify the receiving node from these devices.

Also, in this aspect of the present invention, the data transfer control device may be further comprising: a notice receiving unit for receiving a notice regarding attribute information of transmitting and/or receiving nodes connected with the second physical network; and a memory unit for storing said attribute information.

In this case, it becomes possible to obtain various information regarding the information devices connected to a physical network to which said another data transfer control device is connected, so that it becomes possible to specify an arbitrary node among these devices as the transmitting node.

Also, in this aspect of the present invention, the data transfer control device may be further comprising: a message receiving unit for receiving a control message containing an information capable of specifying the receiving node, from another data transfer control device belonging to the second physical network and/or the transmitting node; wherein the commanding unit commands a receiving of the information data to the receiving node which is specified by said control message.

In this case, it becomes possible to realize the data transfer with respect to the receiving node specified from said another data transfer control device or the transmitting node. Namely, it becomes possible for said another data transfer control device or the transmitting node to clearly specify the receiving node.

Also, in this aspect of the present invention, the data transfer control device may be further comprising: a transmission unit for transmitting a control message containing an information capable of specifying the transmitting node, to another data transfer control device belonging to the second physical network.

In this case, it becomes possible to explicitly specify the transmitting node which is to be the data transfer source to said another data transfer control device, even in a case where the transmitting node is a node operated by a protocol depending on the second physical network and not supporting a protocol between the data transfer control devices, so that it becomes possible to realize the data transfer from the transmitting node to the receiving node regardless of a protocol type of the transmitting node.

According to another aspect of the present invention, there is provided a data transfer control device for controlling transfer of information data from a transmitting node connected with a first physical network to a receiving node connected with a second physical network, the data transfer control device being connected with the second physical network and with a third physical network or the first physical network and comprising: a first establishing unit for establishing a channel in the second physical network; a second establishing unit for establishing a communication path between the data transfer control device and the first physical network or a transmitting node belonging to an upper logical network of the first physical network; a commanding unit for commanding the receiving node to receive the information data transferred through the channel established by the first establishing unit, by using a protocol depending on the second physical network; a conversion unit for converting a data format of the information data received through the communication path established by the second establishing unit, from a first data format depending on the third physical network or the first physical network and/or an upper logical network of the third physical network or the first physical network to a second data format depending on the second physical network; and a transfer unit for transferring the information data with the data format converted by the conversion unit, to the channel established by the first establishing unit.

In this aspect of the present invention, it becomes possible to transfer the data in an appropriate format to the receiving node, by carrying out the data transfer to said channel after the transfer format conversion is carried out, even in a case where the transfer format in the communication path on one physical network side is different from the transfer format in the communication path of another physical network or the upper logical network of said another physical network. By means of this, it becomes possible for the data transfer control device to absorb the difference between the transfer format such as MPEG which is depending on the specific link layer technology such as ATM network or IEEE 1394 and the transfer format depending on the specific logical network such as MPEG-over-IP, etc., for example.

According to another aspect of the present invention, there is provided a data transfer control device for controlling transfer of information data from a transmitting node connected with a first physical network to a receiving node connected with a second physical network, the data transfer control device being connected with the second physical network and comprising: a first establishing unit for establishing a channel in the second physical network; a second establishing unit for establishing a communication path between the data transfer control device and the first physical network or a transmitting node belonging to an upper logical network of the first physical network; a commanding unit for commanding the receiving node to receive the information data transferred through the channel established by the first establishing unit, by using a protocol depending on the second physical network; an encoding/decoding unit for encoding/decoding the information data received through the communication path established by the second establishing unit; and a transfer unit for transferring the information data encoded/decoded by the encoding/decoding unit, to the channel established by the first establishing unit.

In this aspect of the present invention, it becomes possible to transfer the data at an appropriate rate or in an appropriate format to the receiving node, by carrying out the data transfer to said channel after the encoding or decoding of the data is carried out, even in a case where the available communication resource amount (bandwidth, for example) in the communication path on one physical network side is different from the available communication resource amount in the communication path of another physical network or the upper logical network of said another physical network. It also becomes possible to carry out the protocol conversion in a case where the transmitting node and the receiving node uses different coding schemes.

According to another aspect of the present invention, there is provided a data transfer control device for controlling transfer of information data to a receiving node connected with a first network from a transmitting node connected with a second network, the data transfer control device being connected with the first network and comprising: an establishing unit for establishing a communication path for the information data transmitted from the transmitting node by using a signaling protocol of a network layer, the communication path reaching the data transfer control device from the transmitting node or another data transfer control device connected with the second network; a receiving unit for receiving a control message containing an information regarding a channel through which the information data is to be transferred to the receiving node; and a commanding unit for commanding the receiving node to receive the information data transferred through said channel, by using a protocol depending on the first network.

In this aspect of the present invention, even for the data input to a dedicated terminal of the network to which the data transfer control device is connected, which can only understand a protocol depending on said network, by commanding the data reception from the established channel, it becomes possible to realize the data transmission to said dedicated terminal, with respect to the data from an arbitrary transmitting node of an arbitrary physical network in the inter-connected environment.

In particular, in the Internet environment, the guarantee of the communication quality is made by the signaling protocol of the network layer such as RSVP or ST2. As this is done by the data transfer control device, it becomes possible to receive the data with the communication quality guaranteed through the Internet environment, even when the data receiving terminal does not have the IP/RSVP/ST2 function.

Also, in this aspect of the present invention, the data transfer control device may be further comprising: a transmission unit for transmitting a message requesting a conversion of a data format of the information data from a first data format depending on the network layer to a second data format of a protocol depending on the first network, to a node through which the information data passes before being received by the receiving node.

In this case, it becomes possible to resolve the data reception impossibility due to the difference in the data format, as in a case where said dedicated terminal for receiving data cannot understand the data format such as MPEG-over-IP, for example, by carrying out the format conversion at said arbitrary node.

According to another aspect of the present invention, there is provided a data transfer control device for controlling transfer of information data from a transmitting node connected with a first network to a receiving node connected with a second network, the data transfer control device being connected with the first network and comprising: an establishing unit for establishing a communication path for the information data transmitted from the transmitting node by using a signaling protocol of a network layer, the communication path reaching the receiving node or another data transfer control device connected with the second network; a transmission unit for transmitting a control message containing an information regarding a channel through which the information data is to be transferred from the transmitting node; and a commanding unit for commanding the transmitting node to transmit the information data to said channel, by using a protocol depending on the first network.

In this aspect of the present invention, even for the data transmission from a dedicated terminal of the network to which the data transfer control device is connected, which can only understand a protocol depending on said network, by commanding the data transmission to the established channel, it becomes possible to realize the data transmission from said dedicated terminal, with respect to the data to an arbitrary receiving node of an arbitrary physical network in the inter-connected environment.

In particular, in the Internet environment, the guarantee of the communication quality is made by the signaling protocol of the network layer such as RSVP or ST2. As this is done by the data transfer control device, it becomes possible to transfer the data with the communication quality guaranteed through the Internet environment, even when the data transmitting terminal does not have the IP/RSVP/ST2 function.

Also, in this aspect of the present invention, the data transfer control device may be further comprising: a message transmission unit for transmitting a message requesting a conversion of a data format of the information data from a first data format depending on the first network to a second data format depending on the network layer, to a node through which the information data passes before being received by the receiving node.

In this case, it becomes possible to resolve the data transmission impossibility due to the difference in the data format, as in a case where said dedicated terminal for transmitting data cannot understand (cannot transmit) the data format such as MPEG-over-IP, for example, by carrying out the format conversion at said arbitrary node.

According to another aspect of the present invention, there is provided a relay device for transmitting a received data from one network to another network, comprising: a first establishing unit for establishing a channel in said another network; a second establishing unit for establishing a communication path which includes the channel established by the first establishing unit for data transferred from said one network to said another network by exchanging a signaling protocol of a network layer with a data transfer control device in said another network; and a transmission unit for transmitting a control message containing an information regarding the channel to the data transfer control device, such that the data transfer control device commands a receiving node in said another network by using a protocol depending on said another network to receive the data transferred through the communication path established by the second establishing unit.

According to another aspect of the present invention, there is provided a relay device for transmitting a received data from one network to another network, comprising: a reception unit for receiving a control message containing an information regarding a channel established in said one network from a data transfer control device in said one network, the data transfer control device commanding a transmitting node in said one network by using a protocol depending on said one network to transmit the data to the channel; and an establishing unit for establishing a communication path which includes the channel for data transferred from said one network to said another network by exchanging a signaling protocol of a network layer with the data transfer control device.

According to another aspect of the present invention, there is provided a relay device for transmitting a received data from one network to another network, comprising: a receiving unit for receiving a control message requesting a conversion of a data format of the received data from a first data format depending on said one network to a second data format depending on said another network; and a transmission unit for converting the data format of the received data from said one network according to the control message received by the receiving unit, and transmitting converted data to said another network.

In this aspect of the present invention, it becomes possible to resolve the data transmission impossibility due to the difference in the data format, as in a case where the receiving node cannot understand (cannot receive) the data format of the data transferred up to this relay device such as MPEG-over-IP, for example, by carrying out the format conversion at this relay device. Here, the control message can be transmitted from the receiving node or an arbitrary data transfer control node.

According to another aspect of the present invention, there is provided a relay device for transmitting a received data from one network to another network, comprising: a receiving unit for receiving a control message requesting an encoding/decoding of the received data in a data format depending on said one network; and a transmission unit for encoding/decoding the received data from said one network according to the control message received by the receiving unit, and transmitting encoded/decoded data to said another network.

In this aspect of the present invention, it becomes possible to resolve the difference as in a case where the communication resource used by the data transferred up to the relay device is different from the communication resource permitted at the network of the receiving node side, by carrying out the encoding/decoding at this relay device. It is also possible to use this mechanism in such a manner that this relay device carries out the protocol conversion in a case where the coding scheme of the data transferred up to this relay device is different from the coding scheme of the data that can be understood by the receiving node.

According to another aspect of the present invention, there is provided a control device connected with a first physical network, comprising: a collecting unit for collecting attribute information of transmitting and/or receiving nodes connected with the first physical network, according to a protocol depending on the first physical network; and a notifying unit for notifying said attribute information to a device connected with a second physical network, according to a network layer protocol not depending on the first physical network.

In this aspect of the present invention, it becomes possible to notify the attribute information of the information devices connected to the first physical network, independently from a protocol of the physical network, to said device connected with the second physical network, regardless of a type of the second physical network. Also, it becomes possible to urge the operations with respect to these information devices, from the second physical network.

Also, in this aspect of the present invention, the control device may be further comprising: a receiving unit for receiving a network layer protocol packet for controlling at least one of the transmitting and/or receiving nodes connected with the first physical network, from said device connected with the second physical network; and a control unit for controlling said at least one of the transmitting and/or receiving nodes specified by the network layer protocol packet, according to a protocol depending on the first physical network.

In this case, it becomes possible to control a node on the first physical network from a node on the second physical network by means of the protocol conversion by the control unit, even in a case where the first physical network and the second physical network adopt protocols of different link levels so that their connection terminals can only understand protocols depending on the respective physical networks, for example. Namely, it becomes possible to realize the control from an arbitrary device of the second physical network, regardless of a type of the first physical network, even in a case where a control target node can only understand a protocol depending on the first physical network.

According to another aspect of the present invention there is provided a data transfer control device for controlling transfer of information data to a receiving node connected with a first physical network from a transmitting node connected with a second physical network, the data transfer control device being connected with the first physical network and comprising: a control unit for controlling transfer of the information data transferred from a communication path which is reserved for receiving of the information data transmitted from the transmitting node such that the information data are transferred to a channel in the first physical network; and a commanding unit for commanding the receiving node to receive the information data transferred through the channel.

In this aspect of the present invention, even in a case where the receiving node connected with the first physical network cannot request transfer of the information data to the transmitting node (as in a case where the receiving node only supports a datalink dependent protocol or a case where the receiving node has no information transmission function, for example), it becomes possible to carry out the data transfer from the transmitting node regardless of an interconnected network environment (link layer protocol) up to the transmitting node. Namely, for the information data transferred through the reserved communication path, it is possible to urge the receiving node to receive the information data from the channel of the first physical network by means of the establishing unit and the commanding unit, so that it becomes possible to transfer the information data up to the receiving node.

According to another aspect of the present invention there is provided a communication device connected with a network of broadcast type, comprising: a commanding unit for notifying a second communication device connected with said network a first identification information identifying communication resource of said network for the second communication device, and a second identification information identifying a data flow to be received in a network layer, the second communication device having no network layer address or a network layer address different from a destination network layer address of the data flow, so as to command the second communication device to receive the data flow transferred by using the communication resource; and a request unit for requesting a transfer of the data flow in the network layer to a third communication device.

In this aspect of the present invention, while this communication device connected with the network of broadcast type carries out procedures for obtaining and maintaining arbitrary information with respect to Internet, it becomes possible for the second communication device (terminal) on the network of broadcast type to receive desired data by having only a simple network layer flow receiving function.

Namely, in general, a software for realizing network layer packet transmission and reception function requires a large processing routine so that it has been necessary to implement a complicated software. However, the function realized by such a complicated software is Just a redundant function for a receiving terminal on which an application such as that for receiving video is to be executed because what is needed is only receiving of packets and the like on which video data are mounted in payload sections.

For this reason, the function of the terminal is narrowed down to receiving of network layer packets alone, and the provision is adopted such that the terminal receives notification of an information for identifying network layer packets to be received, that is an attribute of a network layer data flow to be received (such as a set of a source network layer address, a receiving network layer address, a source port number, a destination port number, etc.) at every occasion of receiving information data and the terminal receives only that network layer data flow. With this provision, it is possible to realize a very cheap receiving terminal configuration for data such as video through a network layer such as IP.

In addition, this communication device is capable of transmitting a data flow transfer request on behalf of the second communication device which is a receiving terminal, so that even when the conventionally required information transmission function is omitted from the second communication device, it is still possible to specify transfer of arbitrary data flow to the second communication device through this communication device.

Also, in this aspect of the present invention, the communication device may be further comprising: a reserving unit for reserving the communication resource for receiving of the data flow in the network layer by the second communication device.

In this case, when it is necessary to reserve communication resource to be used, such as a channel, etc. of IEEE 1394, prior to their use (as in a case where the traffic to be transferred requires QoS, for example), or when it is possible to establish an isolation from other traffic by reserving communication resource for the data flow, it becomes possible to reserve the communication resource between this communication device and the second communication device. In addition, it becomes possible for the second communication device to recognize in advance that the notified data flow is going to be transferred through the reserved communication resource, so that it also becomes possible to combine a filter for identifying data flow and a filter for identifying communication resource together.

Also, in this aspect of the present invention, the communication device may be further comprising: a processing unit for carrying out a processing in an upper layer of a transport layer with respect to the third communication device.

In this case, even in a system which is operated according to a protocol above a transport protocol for which exchange between a transmitting terminal and a receiving terminal is necessary, such as RTCP (Realtime Transport Control Protocol), it becomes possible for this communication device to carry out the exchange on behalf of the receiving terminal. Consequently, it also becomes possible to operate the above described protocol in a state where the terminal continues to receive data.

Also, in this aspect of the present invention, the communication device may be further comprising: a transfer unit for transferring the data flow to the second communication device by using the communication resource.

According to another aspect of the present invention there is provided a communication device connected with a network of broadcast type, comprising: a first receiving unit for receiving a notification of a correspondence between a first identification information identifying a specified data flow in a network layer and a second identification information identifying communication resource of said network to be used for transferring the data flow notified from another communication device connected with said network; and a second receiving unit for temporarily receiving the specified data flow of the network layer by using the communication resource, where a destination network layer address of the data flow is a network address to be used for receiving of the data flow which is temporarily assigned to the communication device.

In this aspect of the present invention, while the control node connected with the network of broadcast type carries out procedures for obtaining and maintaining arbitrary information with respect to Internet, it becomes possible for this communication device (terminal) on the network of broadcast type to receive desired data by having only a simple network layer flow receiving function.

Namely, in general, a software for realizing network layer packet transmission and reception function requires a large processing routine so that it has been necessary to implement a complicated software. However, the function realized by such a complicated software is just a redundant function for a receiving terminal on which an application such as that for receiving video is to be executed because what is needed is only receiving of packets and the like on which video data are mounted in payload sections.

For this reason, the function of the terminal is narrowed down to receiving of network layer packets alone, and the provision is adopted such that the terminal receives notification of an information for identifying network layer packets to be received, that is an attribute of a network layer data flow to be received (such as a set of a source network layer address, a destination network layer address, a source port number, a destination port number, etc.) at every occasion of receiving information data and the terminal receives only that network layer data flow. With this provision, it is possible to realize a very cheap receiving terminal configuration for data such as video through a network layer such as IP.

Note that this aspect of the present invention is applicable even to a case where this communication device does not originally have any network layer address.

Other features and advantages of the present invention will become apparent from the following description taken in conjunction with the accompanying drawings.

BRIEF DESCRIPTION OF THE DRAWINGS

FIG. 3 is a diagram showing one example of a correspondence table (for a case of transmitting data received from a 1394 side to an ATM side) provided in a 1394/ATM transfer unit of the half gateway of FIG. 2.

FIG. 4 is a diagram showing one example of a correspondence table (for a case of transmitting data received from an ATM side to a 1394 side) provided in a 1394/ATM transfer unit of the half gateway of FIG. 2.

FIG. 6 is a diagram showing one example of a table for storing attribute information of information devices provided in an AV control terminal of the communication network of FIG. 1.

DETAILED DESCRIPTION OF THE PREFERRED EMBODIMENTS

First Embodiment

Referring now to FIG. 1 to FIG. 8, the first embodiment of the present invention will be described in detail.

Figure 1:
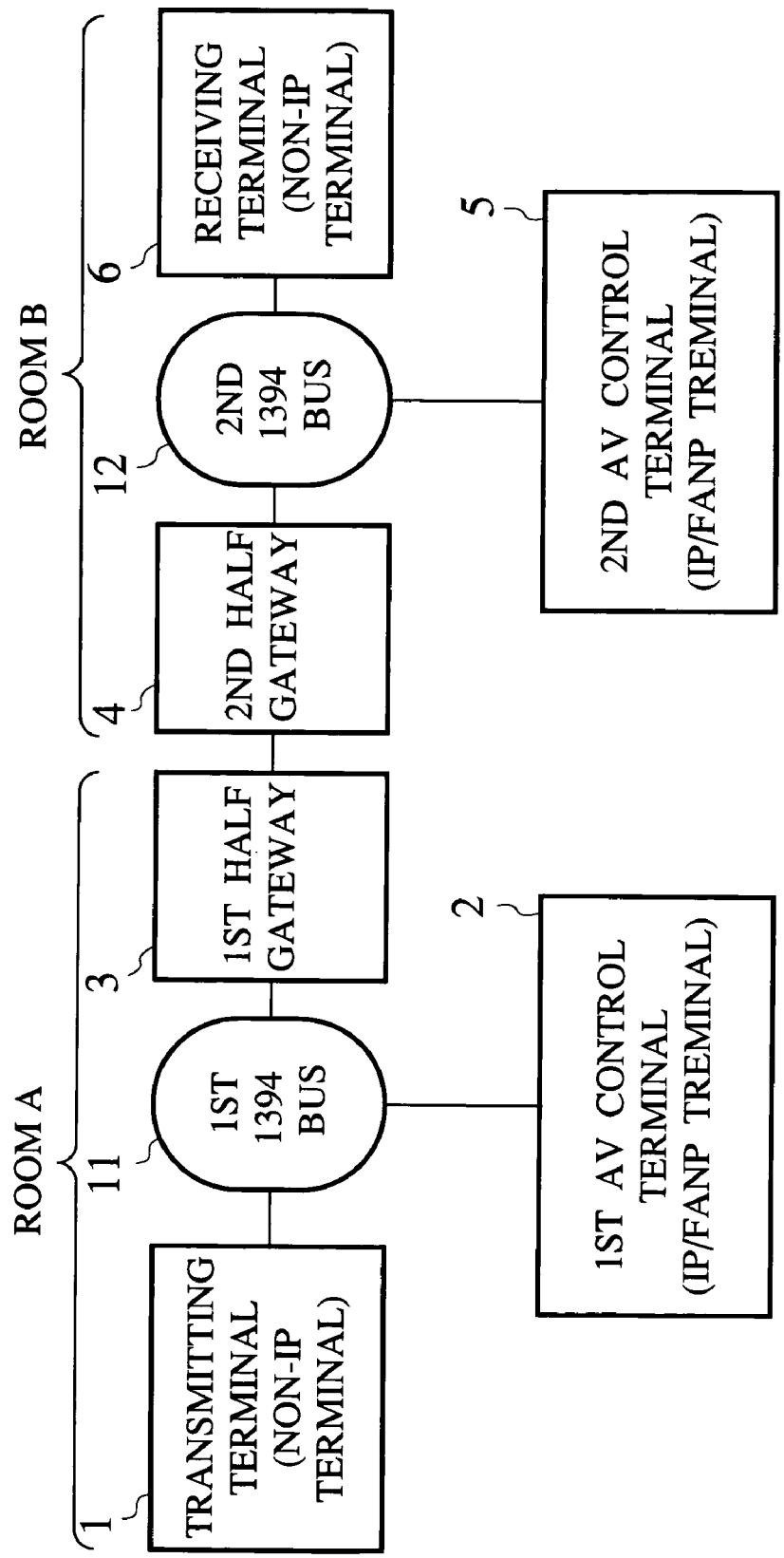
FIG. 1 is a block diagram showing an exemplary overall configuration of a communication network (home network) according to the first embodiment of the present invention.

FIG. 1 shows an exemplary overall configuration of a communication network system according to this first embodiment, which constitutes a home network within a home, for example.

As shown in FIG. 1, this home network comprises a transmitting terminal 1, a first AV (Audio Visual) control terminal 2, a first half gateway 3, a second half gateway 4, a second AV control terminal 5, a receiving terminal 6, a first 1394 bus 11, and a second 1394 bus 12. In this embodiment a transmission scheme between the half gateways 3 and 4 is assumed to be the ATM.

The transmitting terminal 1 and the receiving terminal 6 are non-IP terminals (also referred to as 1394 terminals hereafter), that is, terminals which can only understand the 1394 protocol (a protocol dedicated to 1394 such as AV/C protocol and IEC 61883, for example, and which cannot understand the Internet Protocol (IP). They may be the dedicated 1394 terminals.

This first embodiment is directed to a scheme of communication between terminals based on a control by the AV control terminal, in a case where these transmitting and receiving terminals are (or one of them is) the above described type that cannot understand the Internet protocol and a direct communication by the 1394 protocol cannot be carried out between them (such as a case where the 1394 buses are not bridge connected, that is, a case where a network other than the 1394 bus exists between them or a case where the public network such as the Internet or the ISDN exists between them).

Here, it is assumed that the two 1394 buses 11 and 12 are not directly bridge connected and the ATM network exists between them, so that, on a level of the 1394 protocol, a dedicated 1394 node connected to one 1394 bus cannot see another dedicated 1394 node connected to another 1394 bus.

In contrast, an IP terminal (also referred to as an IP node hereafter) based on the IP which is the inter-connection network protocol can recognize the other IP terminal connected to another bus even when they are terminals connected to these 1394 buses.

Assuming that the transmitting terminal 1 and the receiving terminal 6 are video terminals (as in a case where the transmitting terminal 1 is a DVD player and the receiving terminal 6 is a TV), for example, and that they are provided on the different 1394 buses, the problem is how to realize a communication between them.

Figure 2:
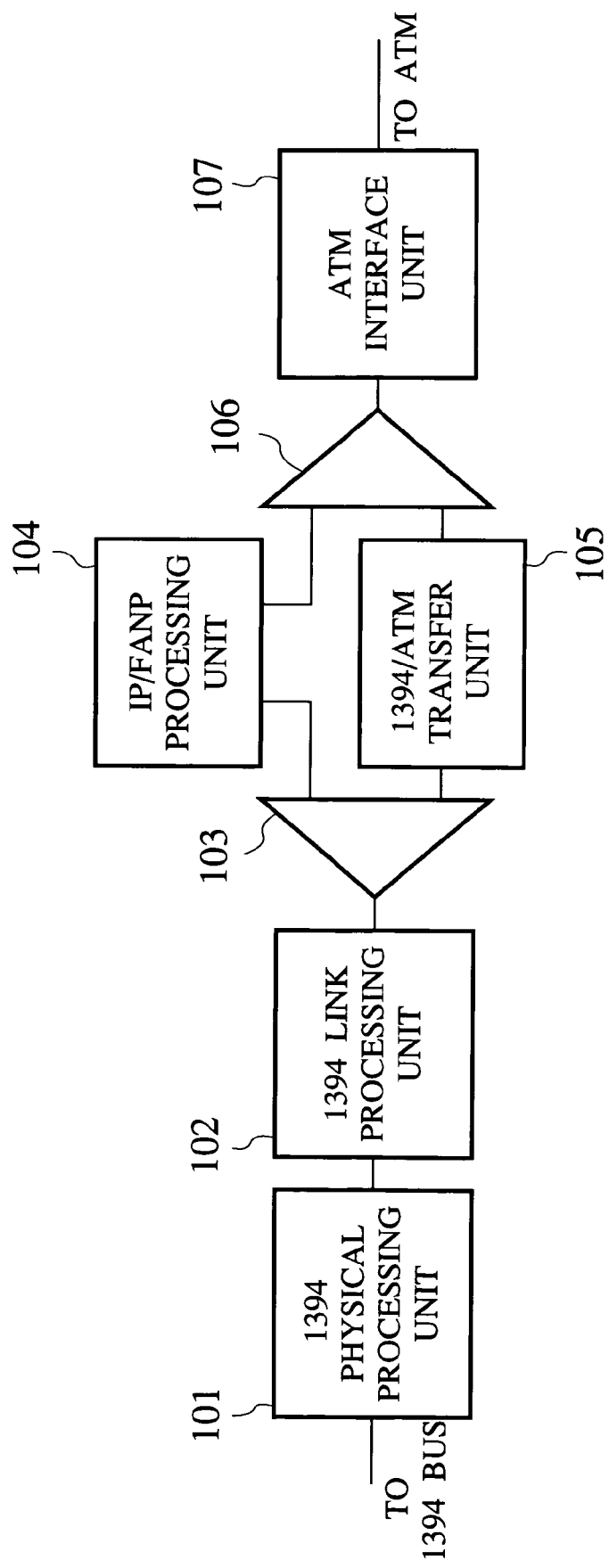
FIG. 2 is a block diagram showing an exemplary internal configuration of a half gateway in the communication network of FIG. 1.

FIG. 2 shows an exemplary internal configuration of each of the half gateways 2 and 3. As shown in FIG. 2, the half gateway comprises a 1394 physical processing unit 101, a 1394 link processing unit 102, a first MUX/DEMUX 103, an IP/FANP processing unit 104, a 1394/ATM transfer unit 105, a second MUX/DEMUX 106, and an ATM interface unit 107.

The 1394 physical processing unit 101 and the 1394 link processing unit 102 carry out the physical layer processing, the link layer processing, the bus management and the transaction layer processing for a connected 1394 bus, as well as the exchanges of data (PDU (Protocol Data Unit) from a viewpoint of the 1394) with the IP/FANP processing unit 104 or the 1394/ATM transfer unit 105, using the 1394 frames to be transmitted or received that are passing through the first MUX/DEMUX 103 and the second MUX/DEMUX 106.

The IP/FANP processing unit 104 has functions for carrying out the routing based on the IP address, the routing table management, the FANP (Flow Attribute Notification Protocol) processing, the ARP (Address Resolution Protocol) processing, etc., for the received IP packets, FANP packets (which will be described below), ARP packets, etc. (For details concerning the FANP, see Japanese Patent Application No. 8-264496 (1996).

The 1394/ATM transfer unit 105 has a function for attaching a specific ATM header (VPI/VCI value) to data received from the 1394 side, especially data received through the isochronous channel by using its isochronous channel number or as a key or though the destination address with the specific register offset by using the information as a key, and transmitting it to the ATM side, and a function for transmitting data received from the ATM side to a specific isochronous channel or the destination address with the specific register offset on the 1394 side by using its header information (VPI/VCI information) as a key. Namely, the data forwarding at this processing unit is carried out by using only the datalink layer processing.

For example, a table of correspondence between the VPI/VCI value and the channel number of the isochronous channel of the 1394 bus or the destination address with the specific register offset is produced in a form of a correspondence table as shown in FIG. 3 (in a case of transmitting data received from the 1394 side to the ATM side) or FIG. 4 (in a case of transmitting data received from the ATM side to the 1394 side), for example. Here, the mapping (the production of each correspondence table) is made by the IP/FANP processing unit 104.

As for the data forwarding function, this function is equipped with a communication quality guarantee function by the FANP as will be described below, and the data scheduling scheme such as WFQ or WRR, for example, may also be implemented.

The ATM interface unit 107 is an interface with respect to the physically connected ATM network (the ATM cable in this embodiment), and carries out the cell assembling and disassembling of data to be exchanged with the second MUX/DEMUX 106 and the ATM cells. This ATM interface unit 107 may also carry out the ABR (Available Bit Rate) processing, the UPC (Usage Parameter Control) processing, SDH (Synchronous Digital Hierarchy) processing, etc.

Note here that, some VC is defined in advance as a default VC of the ATM between the half gateways 3 and 4, and the both half gateways 3 and 4 already recognize that the FANP messages will be exchanged through this default VC, as described in Japanese Patent Application No. 8-264496 (1996).

The first AV control terminal 2 and the second AV control terminal 5 are both IP nodes as well as FANP nodes and apparently capable of carrying out communications by the Internet protocol. As will be described below, these AV control terminals 2 and 5 can understand the 1394 protocol as well as the Internet protocol, and are capable of carrying out communications with local terminals on the 1394 bus by using the 1394 protocol as well as communications with local and remote IP terminals by using the Internet protocol.

In the following, it is assumed that the IP nodes in FIG. 1 are belonging to the same IP subnet.

On each of the AV control terminals 2 and 5, a "video transmission and reception control application" is implemented. This application has the following functions.

(1) A function for checking resources and services (such as nodes) on the own local bus, and communicating the obtained result with each other by using the Internet protocol.

(2) A function for indicating the resources and services of the terminals on the remote bus to the user according to the information obtained by (1), so as to urge the user to carry out operations on them, as well as exchanging these control information with each other.

(3) A function for exchanging FANP packets with each other and reserving a transmission path (a connection with the bandwidth, etc. reserved, if necessary) between the 1394 buses at which the AV control terminals are located.

(4) A function for carrying out the control of nodes on the local bus by using the 1394 protocol (such as AV/C protocol).

By using these AV control terminals, it becomes possible for the user to carry out the exchanges of data with terminals located on the remote 1394 bus, even when transmitting and receiving terminals are not the IP terminals.

The protocol for carrying out the control of AV devices on the 1394 regardless of whether they are local ones or remote ones as described above will be called a FANP-AV protocol here. This protocol may be an IP application.

For example, consider a case where the first 1394 bus 11 is provided at a room A within the home while the second 1394 bus 12 is provided at a room B within the home. Here, suppose that the user who is located in the room B tries to display video data from the transmitting terminal 1 located in the room A, on the receiving terminal 6 located in the room B.

Note that these two rooms may not necessarily belong to the same home. When they are not, there may be a public network between the two half gateways 3 and 4 (in which case they are not necessarily belonging to the same IP subnet so that the broadcast described below may not be carried out and they may recognize each other and their addresses by the manual setting).

Figure 5:
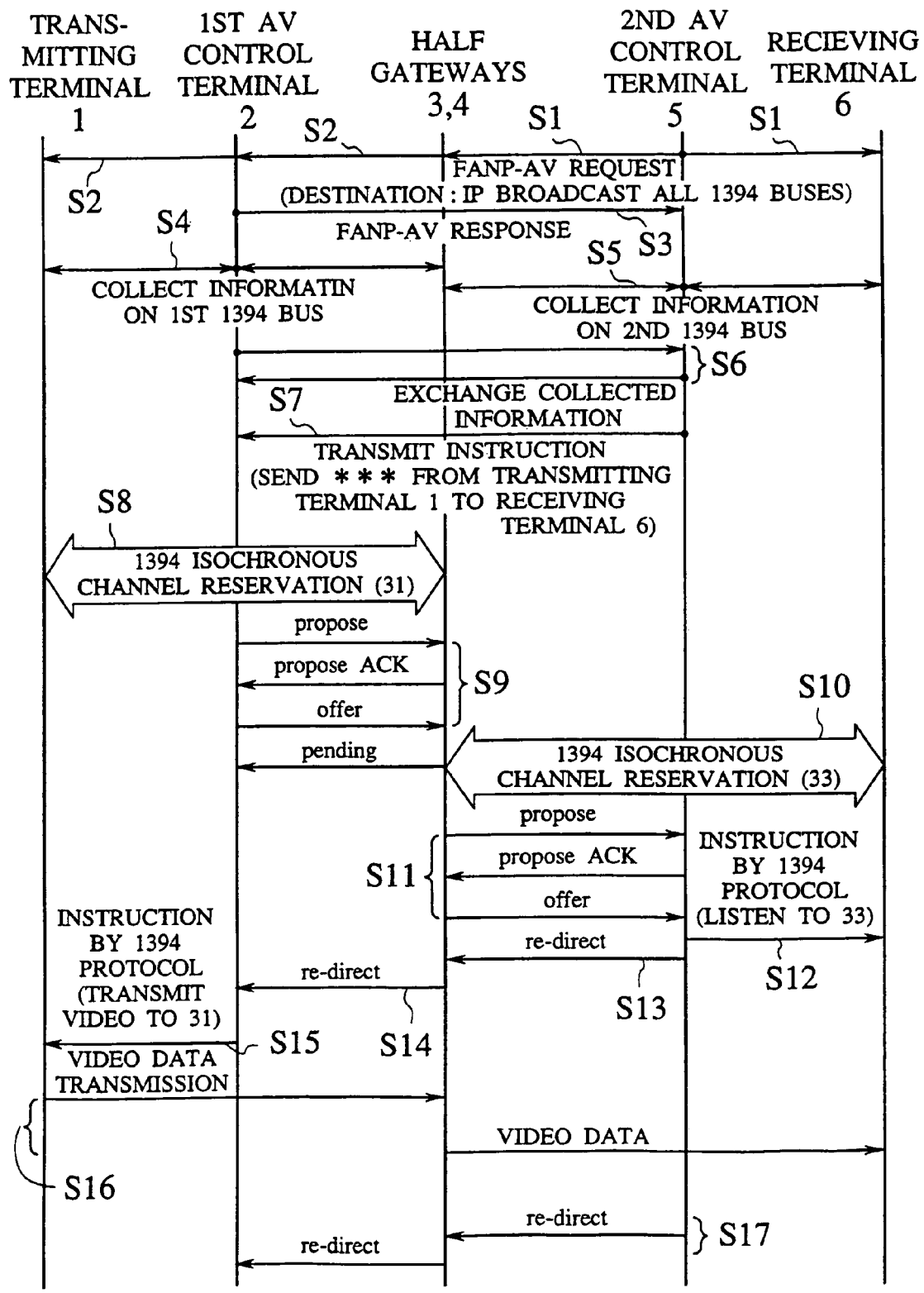
FIG. 5 is a sequence chart for an operation sequence in a case of transmitting video data from a transmitting terminal to a receiving terminal in the communication network of FIG. 1.

Now, with reference to the sequence chart of FIG. 5, the operation procedure (including the FANP-AV protocol) up to the video data exchange between the transmitting terminal 1 and the receiving terminal 6 which are the non-IP terminals will be described.

First, in the communication system of the present invention, the user activates the second AV control terminal 5 and carries out the necessary setting on this second AV control terminal 5. Namely, as shown in FIG. 5, the second AV control terminal 5 transmits a "FANP-AV request" packet to the entire home network, i.e. to the IP broadcast address, in order to check the presence/absence of a node for processing the FANP-AV protocol on the home network (step S1).

This packet is assigned with a well known port number which is allocated to the FANP-AV processing function in advance. This IP broadcast packet may be transmitted to a 1394 address called "bus broadcast address" on the second 1394 bus 12, that is, to the asynchronous channel in a form of broadcast with respect to all nodes in the home network of that home. This broadcast packet reaches to all nodes on the second 1394 bus 12. Note here that it is also possible to transmit this packet to a 1394 address called "local bus broadcast" as long as it is made such that this packet reaches to all nodes within that IP subnet. Namely, even when a network other than the 1394 bus is connected, it is sufficient if it is made such that this packet will be transferred.

Now, the second half gateway 4 that received this packet confirms that it is "broadcast with respect to all buses" from the destination 1394 address, and forwards this packet to the first half gateway 3 side. The first half gateway 3 that received this packet then forwards this packet to the first 1394 bus 11 (step S2). At this point, the destination 1394 address is the "bus broadcast address".

Here, a node which by itself is activating the FANP-AV protocol receives this packet (FANP-AV request packet), and confirms that it is the "FANP-AV request", that is, a packet for searching a node that is activating the FANP-AV protocol, by referring to the port number. Then, this node transmits a "FANP-AV response" packet indicating that "it is also activating the FANP-AV protocol" as a response to the received packet, to its source IP address (step S3). In FIG. 5, the first AV control terminal 2 is the FANP-AV protocol node, so that this terminal transmits the FANP-AV response packet to the second AV control terminal 5 which is the source of the "FANP-AV request" packet. At the same time, the first AV control terminal 2 stores the existence of the second AV control terminal 5 and its IP address.

Note that, as already noted above, instead of carrying out such an automatic constituent recognition, it is also possible for the AV control terminals to recognize each other by using a method in which each AV control terminal registers addresses of the other AV control terminals by the manual setting in advance.

Around this point, each FANP-AV node (AV control terminal 2, 5) collects information on AV devices existing on the 1394 bus to which it is connected, by using the 1394 protocol (step S4 and step S5). This operation may be realized by using protocols such as the AV/C protocol and the IEEE 1212 which are standardized by the 1394 trade association and the HD-DVTR conference, or their extended versions.

In this manner, each AV control terminal 2, 5 collects various information regarding AV devices on the 1394 bus to which it belongs, such as what AV devices they are, what contents they have, how many media they have, what 1394 addresses they have, etc., and store the collected information into an internal table.

Next, the AV control terminals 2 and 5 exchange the collected information with each other (step S6). For this information exchange, each one transmits the collected information to the IP address of the other by using IP packets. As a result, in each AV control terminal 2, 5, a table with contents as shown in FIG. 6 is produced, for example. Namely, by carrying out this information exchange between the AV control terminals 2 and 5, each AV control terminal 2, 5 can collect various information (attribute information) regarding AV devices which are connected with a network to which the other AV control terminal belongs, such as what AV devices they are, what contents they have, how many media they have, what 1394 addresses they have, etc., in addition to the information regarding AV devices on the 1394 bus to which it belongs, on the table of FIG. 6.

Figure 7:
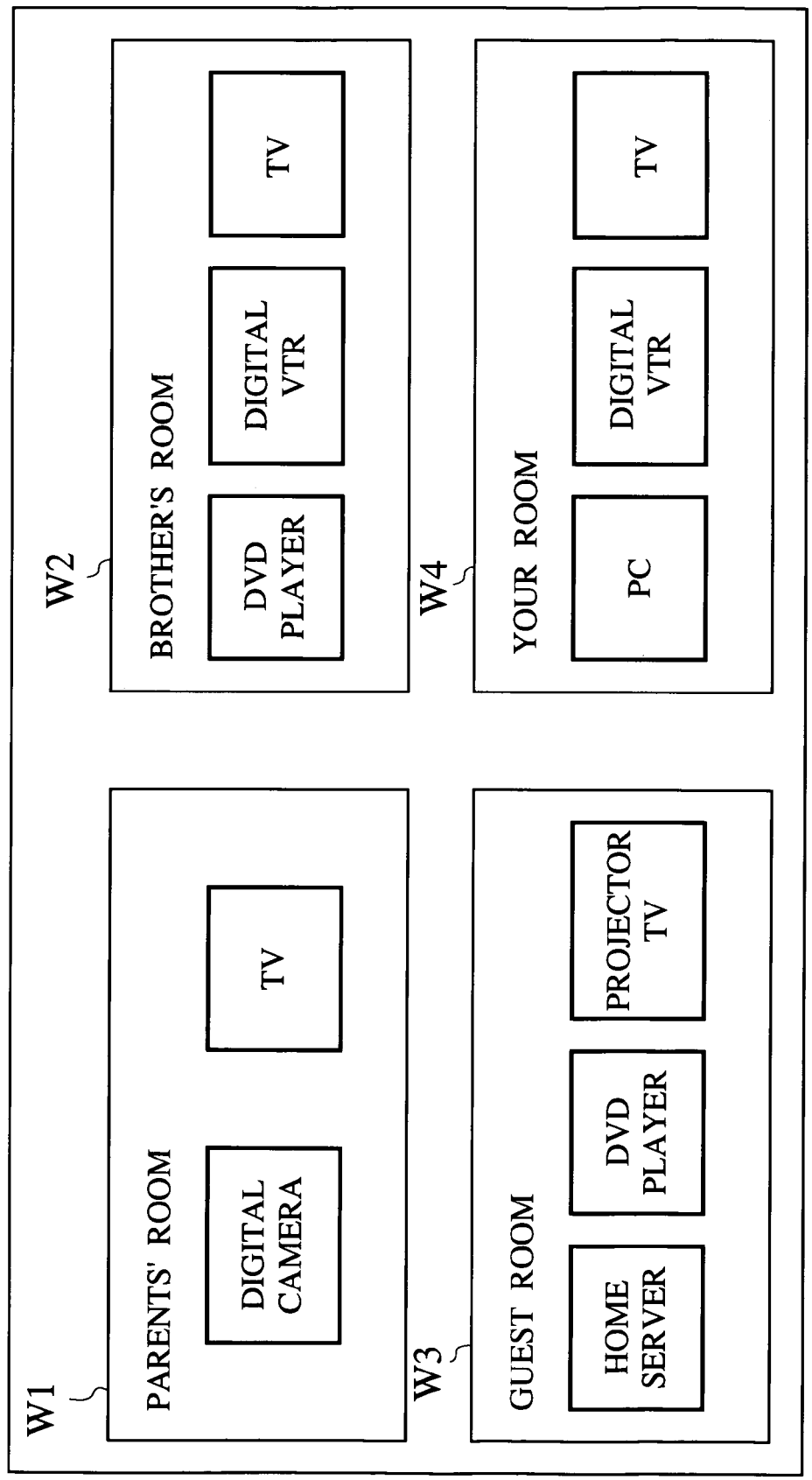
FIG. 7 is a diagram showing one example of a screen display by a display device that can be provided in an AV control terminal of the communication network of FIG. 1.

It is also possible to display the information on the table of FIG. 6 at a display screen of the AV control terminal 2, 5. FIG. 7 shows an exemplary screen display by a display device provided at the second AV control terminal 5. In FIG. 7, for the sake of clarity, under the assumption of one bus per one room (or one datalink network per one room), display windows (W1 to W4) within the display screen are set in correspondence to the respective rooms, and the screen display is presented in a form of an arrangement in each room. By looking at this, the user can make a judgement such as "to/from which terminal should data be transmitted/ received".

For example, suppose that the user in the room B wishes to receive video data from the transmitting terminal 1 and display it on the receiving terminal 6. To this end, the user operates the second AV control terminal 5 so as to make a setting by which appropriate contents constituting the video at the transmitting terminal 1 are transmitted to the receiving terminal 6 and displayed there. This operation may be carried out through the GUI on the second AV control terminal 5. In response, the second AV control terminal 5 transmits an instruction with a content of "send appropriate contents constituting the video at the transmitting terminal 1 to the receiving terminal 6" to the first AV control terminal 2 (step S7). By means of this, the first AV control terminal 2 can ascertain the address of the transmitting terminal 1 which is the transmission destination in a form of the 1394 address.

The first AV control terminal 2 that received this instruction communicates with the transmitting terminal 1 by the 1394 protocol, and checks whether the video transmission is possible or not. In addition, the operation such as the authentication with respect to the second AV control terminal 5 may also be carried out.

Next, the first AV control terminal 2 reserves the isochronous channel of the first 1394 bus 11 by using the 1394 protocol and the 1394 AV protocol, etc., at the first 1394 bus 11 (step S8). A channel number reserved at this point is assumed to be #X (the isochronous channel 31 of FIG. 8). Also, as should be apparent, the bandwidth necessary for the video transmission is to be reserved at the same time by acting on the isochronous resource manager of the first 1394 bus 11.

Next, the first AV control terminal 2 makes a setting with respect to the first half gateway 3 so that the isochronous channel #X will be received there. Then, the first AV control terminal 2 transmits the offer message of the FANP toward the first half gateway 3 through this isochronous channel (step S9).

Here, the FANP is the protocol described in Japanese Patent Application No. 8-264496 as already noted above. Namely, this protocol is used for the purpose of carrying out communications with a neighboring node that can interpret the FANP (which is usually provided at a middle of network segments that constitute the home network and plays a role of an inter-connection device for these plurality of segments), and notifying the identifier of the channel through which data are to be transmitted, their destination address, and their communication attribute and communication quality. It is also possible to use this protocol for the purpose of setting up an end-to-end connection.

Now, this offer message conveys a channel number (or a virtual channel identifier, etc.) by which data (a video data in this embodiment) are to be transmitted from now on, a destination address (an IP address in this embodiment) of that video data, the bandwidth to be used (communication quality), the communication attribute (such as a coding scheme like MPEG, etc.), an end-to-end ACK request, etc. Note that when the transmission channel number or virtual channel identifier is not shared by the terminals at both ends, the exchange of the propose message and the propose ACK message of the FANP may be exchanged between these ends. Also, the destination address (target IP address) of that data is the IP address of the second AV control terminal.

The first half gateway 3 that received this offer message confirms that the second AV control terminal 5 exists in a direction of the second half gateway 4 by referring to the internal routing table, and checks whether it is possible to support the bandwidth, communication quality, etc. requested by this offer message by referring to the idle bandwidth, etc., of a communication path inside the second half gateway 4. When it is judged that it is possible to support them, the propose message, the propose ACK message, the offer message, etc., are transmitted to the second half gateway 4 similarly as in the above processing. On the other hand, when it is judged that it is not possible to support them, a reject message is transmitted to the first AV control terminal 2.

The second half gateway 4 checks the internal communication resources (checks whether the communication quality described in the offer message is internally possible or not similarly as in the first half gateway 3), and establishes the isochronous channel #Y (the isochronous channel 33 of FIG. 8) on the second 1394 bus 12. Around this point, the second half gateway 4 commands the second AV control terminal 5 to take the contents of this isochronous channel, by using the 1394 protocol. After that, the exchanges of the propose message, the propose ACK message and the offer message are carried out between the second half gateway 4 and the second AV control terminal 5 (step S11).

The second AV control terminal 5 that received the propose message and the offer message recognizes that they are for the video transmission earlier requested by this second Av control terminal 5 to the first AV control terminal 2, according to the flow ID or the prescribed identifier agreed by both sides in advance. This prescribed identifier can be that which is conveyed by the FANP message.

Next, the second AV control terminal 5 commands the receiving terminal 6 to receive the data transmitted through the isochronous channel #Y, by using the 1394 protocol such as IEC 61883 (step S12). By means of this, the data transmitted through the isochronous channel #Y can be received by the receiving terminal 6.

After that, the second AV control terminal 5 transmits the re-direct message to the second half gateway 4 (step S13). This re-direct message is a message that bears the meaning that the setting offered by the offer message of the step S11 is accepted. When the offer message contains the end-to-end ACK request, the re-direct message is transmitted by setting the end-to-end ACK flag ON (where setting the end-to-end ACK flag ON implies that a route for transmitting the video data from the transmitting terminal 1 to the receiving terminal 6 has been set up). This ACK flag reaches to the transmitting terminal (the first AV control terminal 2 in this embodiment).

The second half gateway 4 that received this re-direct message makes an appropriate setting to the internal 1394/ATM transfer unit 105 (more specifically the setting of the corresponding table such as that shown in FIG. 3 or FIG. 4). Namely, the ATM virtual connection 32 (shown in FIG. 8) offered by the offer message at the step S9 and the isochronous channel #Y are switch connected at the datalink layer. More specifically, at the 1394/ATM transfer unit 105, the ATM cells entered from the ATM virtual connection 32 are transferred to the 1394 data and entered into the isochronous channel #Y, by referring to the VCI value directly, without any processing by the IP/FANP processing unit 104. At this point, the data/packet scheduling scheme in which the communication quality defined by the FANP can be maintained may be selected. Note that the correspondence table inside the 1394/ATM transfer unit 105 which is to be referred at this point is that shown in FIG. 3 or FIG. 4.

The re-direct message returns from the second half gateway 4 to the first half gateway 3 (at which the setting of the 1394/ATM transfer unit 105 is made similarly as in the second half gateway 4), and then to the first AV control terminal 2 (step S14).

Figure 8:
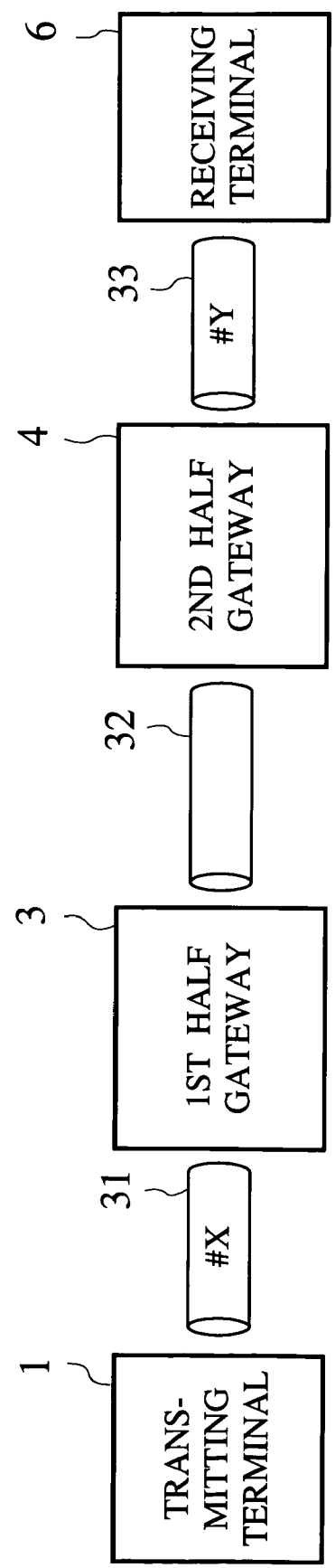
FIG. 8 is a diagram showing a communication route set up in the communication network of FIG. 1 according to the sequence of FIG. 5.

Here, the first AV control terminal 2 confirms that the datalink layer connection up to the final terminal as shown in FIG. 8 has been set up. Here, the final terminal is the receiving terminal 6 in this embodiment, but the receiving terminal 6 is the dedicated 1394 terminal and not a node that can understand the FANP and the IP. It is the second AV control terminal 5 that made the preparation such that the receiving terminal 6 can receive the video data, and the setting was made by this second AV control terminal 5 by using the 1394 protocol.

Then, the first AV control terminal 2 commands the transmitting terminal 1 to carry out the transmission of the corresponding appropriate video with respect to the isochronous channel with the channel number #X (the isochronous channel 31 of FIG. 8), by using the 1394 protocol (step S15).

The transmitted video reaches to the receiving terminal 6 through the isochronous channel 31 on the first 1394 bus 11, the ATM virtual connection 32, and the isochronous channel 33 on the second 1394 bus 12 (step S16). At the intermediate nodes (the half gateways 3 and 4), only the switching in the datalink layer is applied, so that the data transfer is carried out by maintaining the communication quality while the data pass through this route.

The transmission of the re-direct message for the purpose of connecting this video transmission is carried out from the second AV control terminal 5 toward the upstream side (that is, through the second half gateway 4 and the first half gateway 3, to the first AV control terminal 2) (step S17).

Also, a request for interruption of the transmission from the user side (the transmission of the release message) is also sent from the second AV control terminal 5 in the similarly order. At this point, the first AV control terminal 2 carries out the control by the 1394 protocol such as AV/C protocol toward the transmitting terminal 1 so as to terminate the video transmission.

As described, according to the communication network system of this embodiment, the control of AV devices over a plurality of 1394 buses such as the video delivery, interruption, etc., from the transmitting terminal 1 to the receiving terminal 6 is carried out by the FANP and the FANP-AV, despite of the fact that the transmitting terminal 1 and the receiving terminal 6 are not the IP terminals (that is, through the AV control terminals 2 and 5).

In general, the implementation of the IP is said to be costly, but by using the scheme of the present invention, the control between AV devices in which the IP is not implemented and the control of connection over a plurality of 1394 buses can be carried out by the AV control terminals 2 and 5 in which the IP and the FANP are implemented, so that a simplification, a low cost implementation, and a centralized control can be realized for the system as a whole. In addition, it should be apparent that the same can be realized by exactly the same principle even when a plurality of FANP nodes exist between the half gateways. Consequently, it becomes possible to carry out the control between AV terminals on arbitrary 1394 buses, without requiring a long distance 1394 bus transfer or a complicated 1394 bridge protocol which are the drawbacks of the 1394 buses.

Note that, in this embodiment, it is assumed that the AV control terminals 2 and 5 carry out communications with each other by using the IP, but it is also possible to realize this feature by using the other network layer technology (such as Netware, CLNP (Connection-Less Network Protocol), etc.) or the other technology such as I-PNNI (Integrated P-NNI), instead of the IP.

Also, in this embodiment, the set up of the connection (channel) between the AV control terminals 2 and 5 is made by using the protocol called FANP, but it is easily possible to realize this feature by using the other connection set up protocol such as RSVP (Resource Reservation Setup Protocol), ST2 (Stream Transport Protocol-2), or I-PNNI, instead of the FANP.

Also, in this embodiment, it is assumed that the network to which the transmitting terminal 1 and the receiving terminal 6 are connected is the IEEE 1394 bus, but it is also possible to use FDDI2 or the broadcast based network such as home ATM-LAN as described in Japanese Patent Application No. 8-108015 (1996), in substantially the same manner as described above. Moreover, it is also possible to use a network which is not broadcast based, by modifying the AV control terminal to also carry out the connection set up between the half gateways and the transmitting/receiving terminals in a manner of the third party set up.

Also, in this embodiment, it is assumed that the AV control terminal 2, 5 and the half gateway 3, 4 are provided in separate bodies, but they may be provided within the same body. Namely, when the AV control terminal 2 and the half gateway 3 are provided in an identical body while the AV control terminal 5 and the half gateway 4 are provided in an identical body, it is possible to regard the half gateways 3 and 4 themselves as incorporating the functions of the AV control terminals 2 and 5.

Also, in this embodiment, a scheme in which the information regarding AV devices on local buses is exchanged between the AV control terminals 2 and 5 has been described, but when a number of AV control terminals increases, this information exchange may be carried out by using mesh connections among the AV control terminals. It is also possible to use a scheme in which one AV control terminal functioning as a server distributes the information to the other AV control terminals, or the hybrid of these schemes in which some AV control terminal aggregates the information for a plurality of AV control terminals and notifies the aggregated information to the other AV control terminals.

Also, in this embodiment, when the user is operating the AV control terminal, the resulting control process may be displayed on a display device provided at the receiving terminal 6.

Second Embodiment

Referring now to FIG. 9 to FIG. 17, the second embodiment of the present invention will be described in detail.

This second embodiment is directed to a case where the end-to-end data transmission is controlled by the signaling protocol of the network layer such as RSVP, ST2, etc., and the data exchanges with a network of that network layer are to be carried out.

Figure 9:
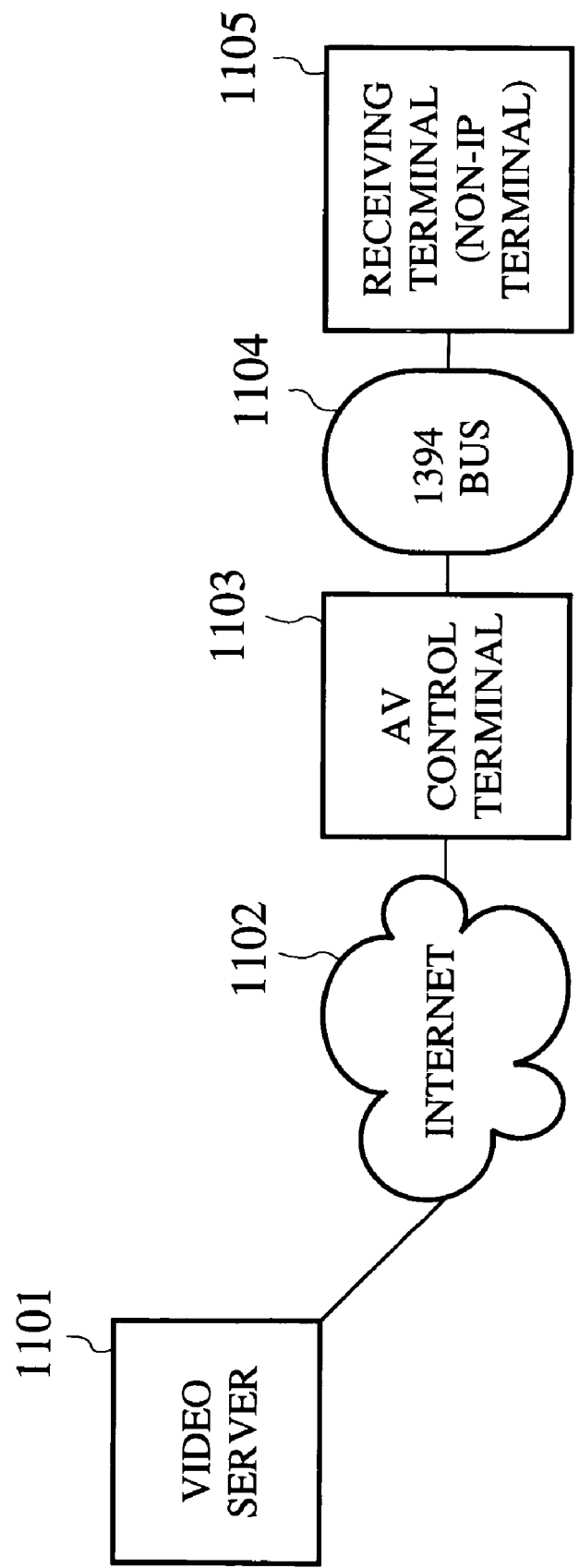
FIG. 9 is a block diagram showing an exemplary overall configuration of a communication network according to the second embodiment of the present invention.

FIG. 9 shows an exemplary overall configuration of a communication network system according to this second embodiment, In FIG. 9, an AV control terminal 1103 is connected to the Internet 1102 (or arbitrary network), and connected with a receiving terminal 1105 through a 1394 bus 1104. Then, the video data delivery from a video server 1101 connected to the Internet 1102 is to be carried out with respect to the receiving terminal 1105, for example.

The video server 1101 is the Internet terminal which transmits the video data on IP packets, that is, in the format of MPEG-over-IP. For example, this video server 1101 may carry out the transmission of the TS (Timestamp) of the MPEG by RTP.

The AV control terminal 1103 is connected between the Internet 1102 and the 1394 bus 1104, and has functions for carrying out a control to the Internet 1102 side, a control to the 1394 bus 1104 side, and transmitting data from one network to another network by matching communications from both. This AV control terminal 1103 may be provided in a form of a unit called set-top box.

The receiving terminal 1105 is a non-IP terminal that can understand the 1394 protocol only, which carries out the video data reception. Consequently, the reception of MPEG data must obey the data format of MPEG-over-1394 as defined by the IEC 61883, for example.

As described above, in this embodiment, it is assumed that the video data transfer from the video server 1101 is realized by the transmission in the format of MPEG-over-IP through the Internet 1102. In order to carry out this video data transmission by maintaining the communication quality while being in the Internet 1102, the communication quality is guaranteed by the RSVP inside the Internet 1102. Here, of course, the guarantee may be made by the ST2 or the FANP, although this embodiment describes a case of using the RSVP.

Now, a procedure for transmitting the video data from the video server 1101 to the receiving terminal 1105 which is not the IP terminal in the communication network system of FIG. 9 will be described.

Figure 10:
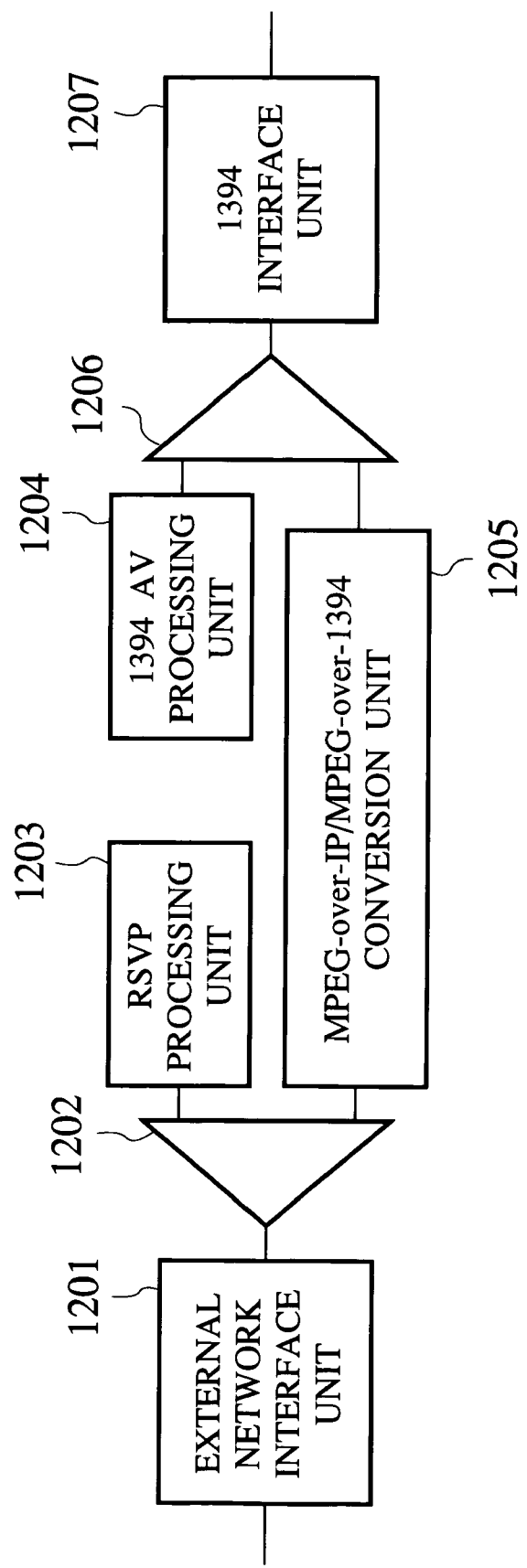
FIG. 10 is a block diagram showing an exemplary internal configuration of an AV control terminal in the communication network of FIG. 9.

FIG. 10 shows an exemplary internal configuration of the AV control terminal 1103. As shown in FIG. 10, the AV control terminal 1103 comprises an external network interface unit 1201, a first MUX/DEMUX 1202, an RSVP processing unit 1203, a 1394 AV processing unit 1204, an MPEG-over-IP/MPEG-over-1394 conversion unit 1205, a second MUX/DEMUX 1206, and a 1394 interface unit 1207.

The external network interface unit 1201 is an interface with respect to the Internet 1102, which is an interface on the datalink layer and the physical layer in particular, and which transmits the received data to the RSVP processing 1203 or the MPEG-over-IP/MPEG-over-1394 conversion unit 1205 through the first MUX/DEMUX 1202 according to the need.

The RSVP processing unit 1203 has a function for reserving a route that guarantees the communication quality between the AV control terminal 1103 and an arbitrary terminal (the video server 1101 in this embodiment) connected to the Internet 1102 by carrying out the RSVP processing, and a function for carrying out the IP processing.

The 1394 AV processing unit 1204 has a function for carrying out the processing of the 1394 AV protocol (AV/C protocol, IEC 61883, etc.) or the FANP-AV protocol described in the first embodiment, through the 1394 bus 1104.

The MPEG-over-IP/MPEG-over-1394 conversion unit 1205 has a function for converting the MPEG frames entered from the Internet 1102 in the MPEG-over-IP format into the MPEG-over-1394 format and transmitting them. Of course, it may also has a function for converting in the opposite direction. This format conversion may be carried out by referring to the source address, destination address, port number, flow labels, etc., of the arrived IP packet, or in a case where the Internet is the virtual connection type network, this format conversion may be carried out by referring to the virtual channel identifier or channel number, etc. In this embodiment, the processing of the latter case will be described as an example.

The 1394 interface unit 1207 is an interface with respect to the 1394 bus 1104, and more specifically, has functions for carrying out the physical layer processing, the link layer processing, the transaction layer processing and the bus management.

The AV control terminal in a configuration shown in FIG. 10 is for a case where the receiving terminal 1105 has the MPEG reproduction function (MPEG decoding function). In addition, the AV control terminal 1103 may also have a function (including analog circuits, etc.) generally called set-top box.

The user acts on the AV control terminal 1103 when the user wishes to receive the video data from the video server 1101 at the receiving terminal 1105. Namely, the user makes the setting with respect to the AV control terminal 1103, as to which video should be sent from which video server and at which receiving terminal it should be received (watched).

At this point, instead of requiring the user to act directly on the AV control terminal 1103, the system may have a configuration in which, when the user acts on the other terminal, a control message is sent from that other terminal to the AV control terminal so as to request a subsequent series of control operations.

The AV control terminal 1103 requests the video data transmission to the video server 1101 which is the IP node, by using the IP protocol. This operation may be realized through a protocol such as HTTP. Also, this operation may be realized in a form in which the control protocol such as DSM-CC defined by the ITU-T and DAVIC flows over the Internet.

Figure 11:
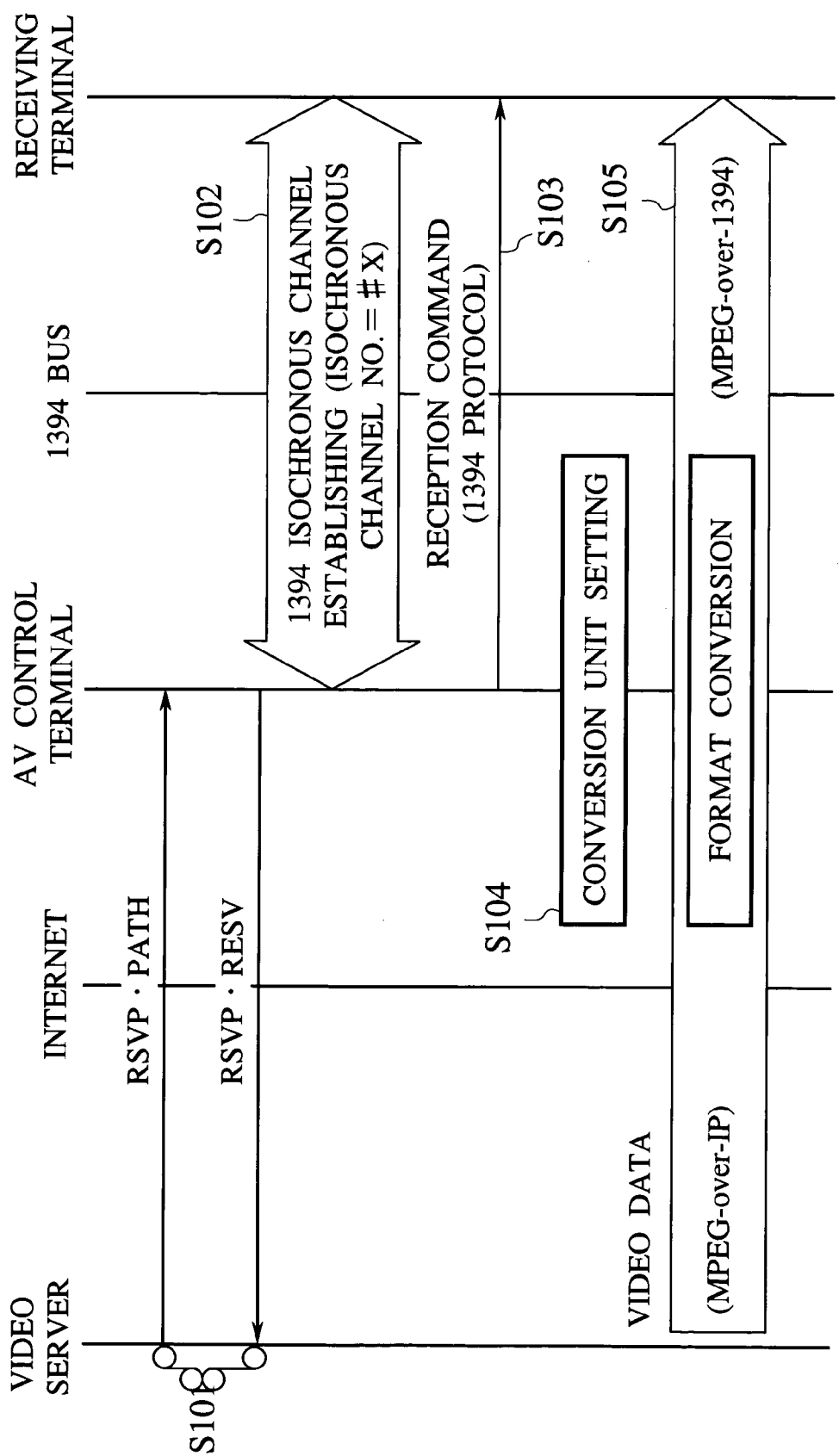
FIG. 11 is a sequence chart for an operation sequence in a case of transmitting video data from a video server to a receiving terminal in the communication network of FIG. 9.

At this point, it is also possible to use a scheme in which the PATH message of the RSVP is flowing from the video server 1101 and the AV control terminal 1103 sends the RESV message of the RSVP in response so as to establish a route guaranteeing the QOS between the video server 1101 and the Av control terminal 1103 (step S101 of FIG. 11).

In addition, the AV control terminal 1103 establishes the isochronous channel (channel number #X) on the 1394 bus with respect to the receiving terminal 1105, and transmits a message for commanding the reception of data from this isochronous channel by using the 1394 protocol such as IEC 61883, AV/C protocol, or 1394-1995 (step S102 and step S103 of FIG. 11).

Along with that, the setting of the MPEG-over-IP/MPEG-over-1394 conversion unit 1205 is made, that is, the setting by which a packet in the MPEG-over-IP format entered from the Internet 1102 is taken out according to its header information (an identifier of the datalink layer connection through which this packet passes, or the IP header information, or the flow label, etc.), converted into the data format of the MPEG-over-1394, and transmitted to the prescribed isochronous channel #X (the isochronous channel 1111 of FIG. 12) on the 1394 bus 1104 (step S104). This setting may be made in a form which guarantees the communication quality such as jitter or delay time.

Figure 12:
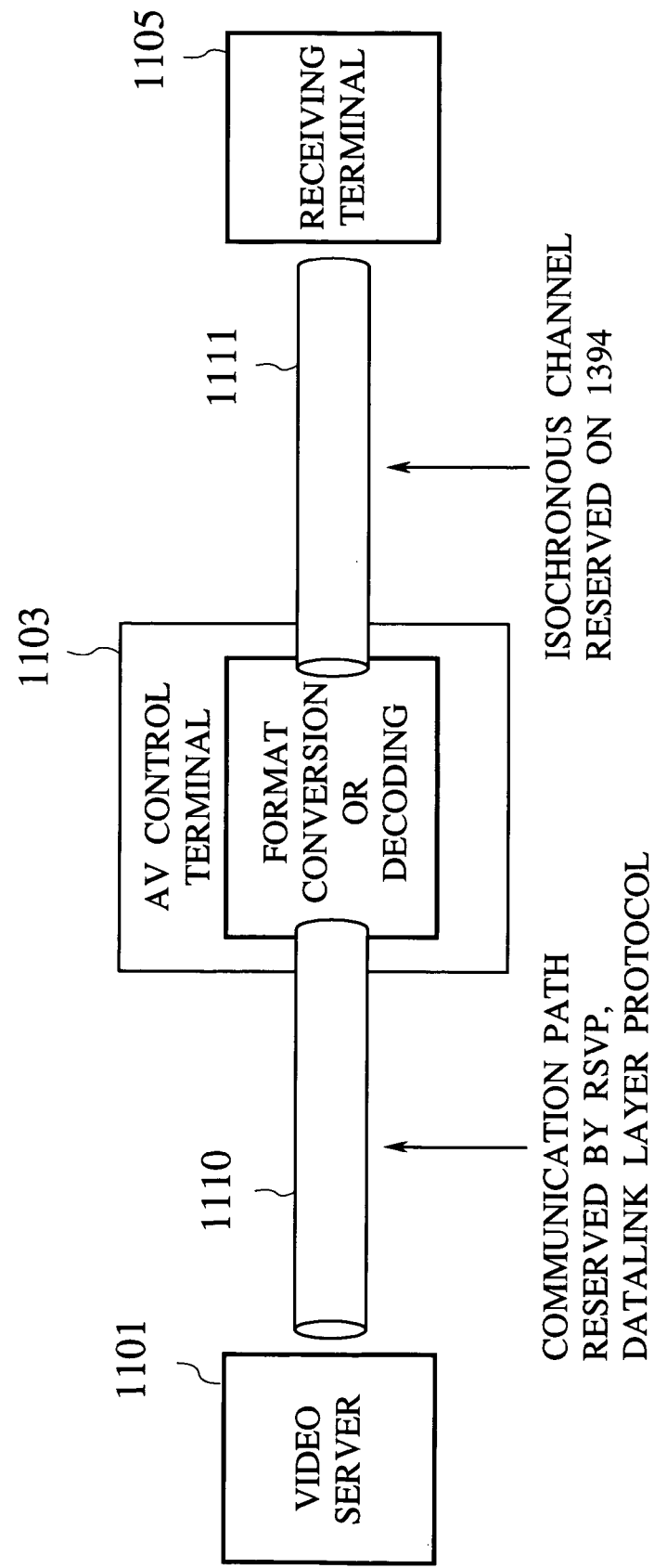
FIG. 12 is a diagram showing a communication route set up in the communication network of FIG. 9 according to the sequence of FIG. 11.

By means of this, a route 1110 and 1111 (a route with the communication quality guaranteed) from the video server 1101 to the receiving terminal 1105 as shown in FIG. 12 is reserved.

Here, the MPEG packet among the packets that passed through the Internet 1102 is forwarded to the MPEG-over-IP/MPEG-over-1394 conversion unit 1205, and an information for triggering the format conversion there may be the VPI/VCI value that carries this MPEG data, when the access datalink of the Internet 1102 is the ATM, for example. In this case, there is no need to bring this processing up to the IP layer.

Also, when the access datalink is the STM network, the format conversion may be triggered by an input from its channel number/specific time-slot, etc. In this case, there is no need to bring this processing up to the IP layer either.

Also, the format conversion may be triggered by using a part of the header information of the IP packet (such as "destination address+port number", the flow label of the IPv6, etc.).

The MPEG data are transmitted from the video server 1101 in the format of MPEG-over-IP, so that the AV control terminal 1103 converts them into the MPEG-over-1394 format at the MPEG-over-IP/MPEG-over-1394 conversion unit 1205 and then transmits them to the receiving terminal 1105 (step S105).

In this manner, the reception of the video data transmitted by the IP can be realized even at the receiving terminal which is not the IP terminal (the receiving terminal 1105 in this embodiment).

Note that the 1394 bus 1104 portion may be replaced by a group of bridge connected 1394 buses, or a network formed by mixed networks of the 1394 buses and other networks in which the 1394 bus is emulated.

Figure 13:
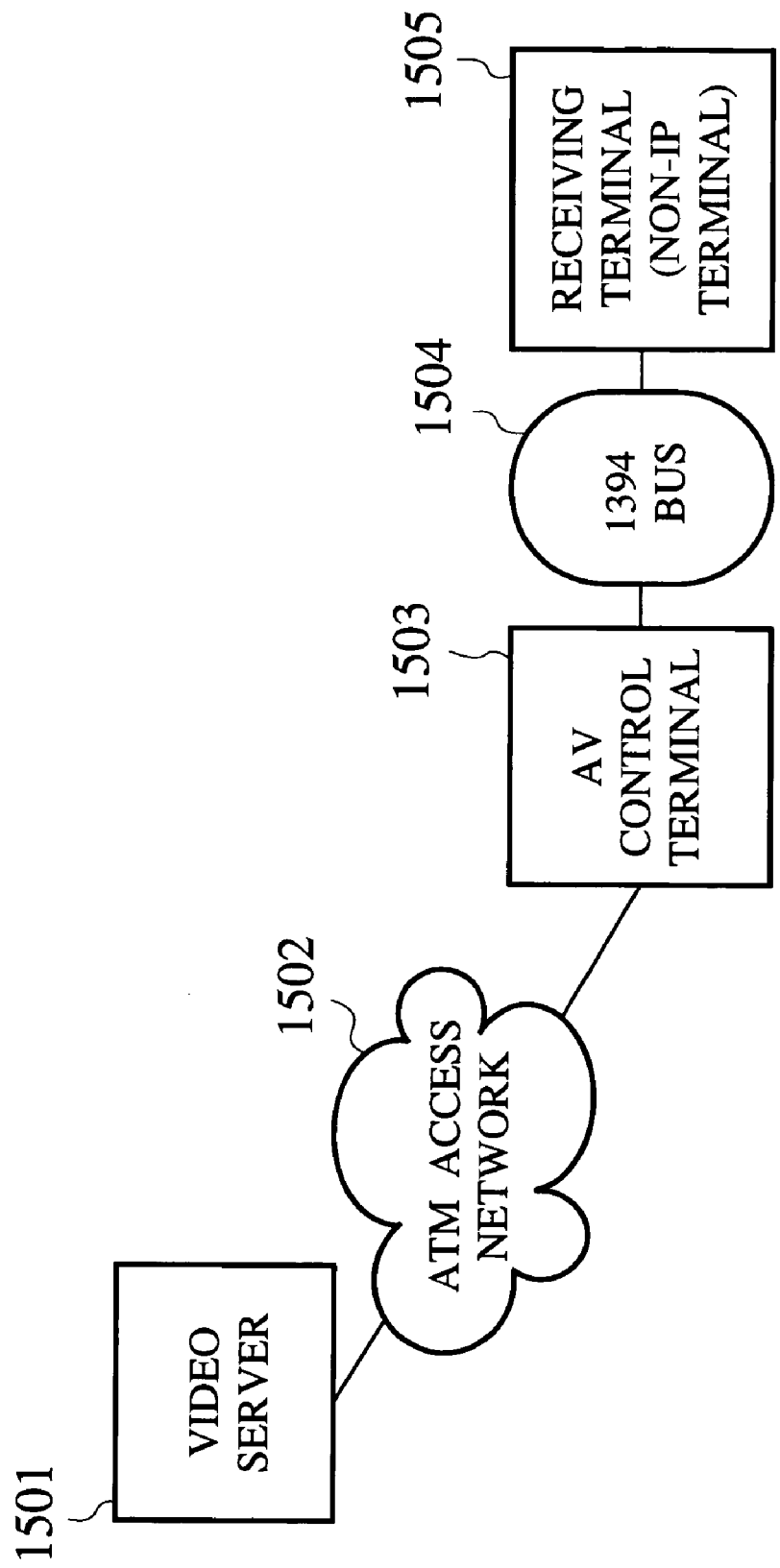
FIG. 13 is a block diagram showing another exemplary overall configuration of a communication network according to the second embodiment of the present invention, which uses an ATM access network instead of the Internet of FIG. 9.

It is also possible to use the ATM access network as the access network to the home instead of the Internet 1102. FIG. 13 shows an exemplary overall configuration of the communication network system in such a case, which differs from FIG. 9 in that the Internet 1102 of FIG. 9 is replaced by an ATM access network 1502.

Note that, in this case, in FIG. 13, the AV control terminal 1503 and/or the video server 1501 may be the ATM terminal (a terminal that can understand and process only the ATM-API), so that the exchange between the AV control terminal 1503 and the video server 1501 will involve the call set up by the ATM signaling, etc.

Figure 14:
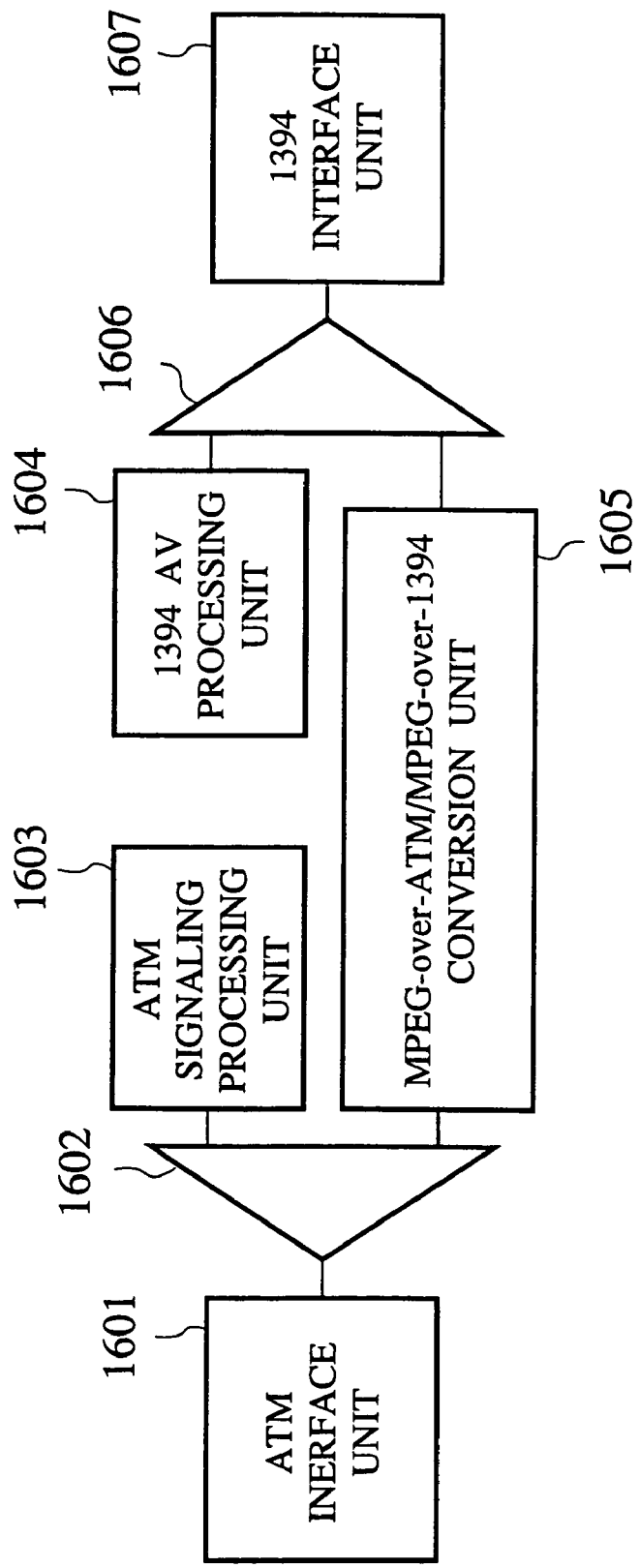
FIG. 14 is a block diagram showing an exemplary internal configuration of an AV control terminal in the communication network of FIG. 13.

FIG. 14 shows an exemplary internal configuration of the AV control terminal 1503. As shown in FIG. 14, the format conversion is made between the MPEG-over-ATM format and the MPEG-over-1394 format at the MPEG-over-ATM/MPEG-over-1394 conversion unit 1605. Here, the MPEG-over-ATM format may be in a form according to the protocol defined by the AMS of the ATM forum.

The call set up by the ATM signaling between the AV control terminal 1503 and the video server 1501 is to be carried out at an ATM signaling processing unit 1603.

The functions of the other elements of FIG. 14 are the same as those of FIG. 10.

Figure 15:
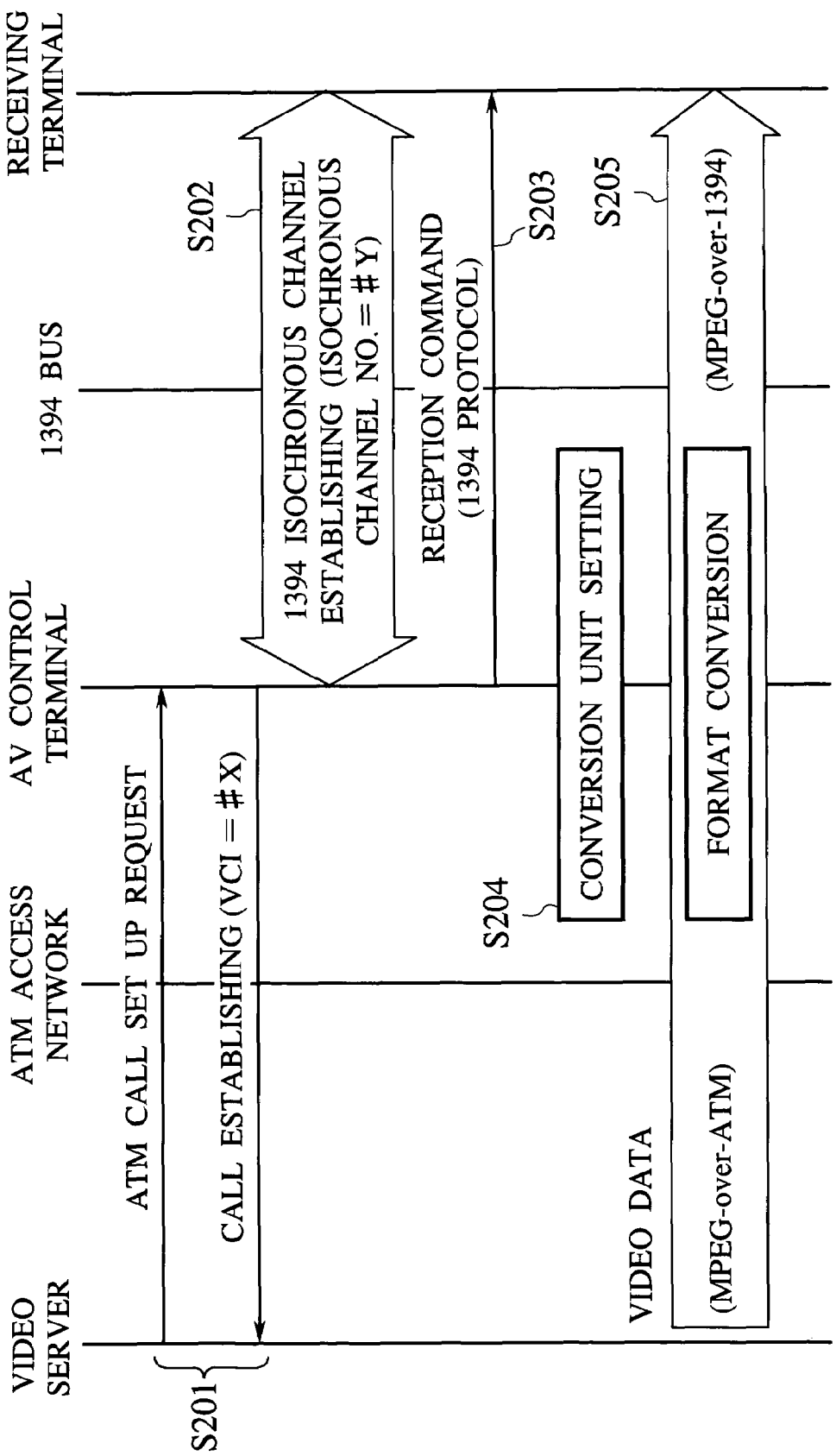
FIG. 15 is a sequence chart for an operation sequence in a case of transmitting video data from a video server to a receiving terminal in the communication network of FIG. 13.

FIG. 15 shows a sequence chart for the operations of the communication network system of FIG. 13 as a whole. FIG. 15 differs from FIG. 11 in that the virtual connection (VCI=#X) for carrying out the call set up by the ATM signaling is established at a time of establishing a route between the video server 1501 and the AV control terminal 1503 at the step S201 of FIG. 15 (which corresponds to the step S101 of FIG. 11). The other parts of FIG. 15 are substantially the same as FIG. 11.

Note that, in this embodiment, an example in which the network inside the home is formed by the 1394 bus has been described, but the scheme of the present invention is equally applicable to a case where the network inside the home is not the 1394 bus but the other network technology (such as the ATM, etc.).

The above embodiment is directed to an exemplary case in which the MPEG decoder is provided at the receiving terminal side. However, it is also possible to consider a case in which the MPEG decoder does not exist on the receiving terminal side and the receiving terminal only has a function for receiving the raw video data directly and displaying them.

Figure 16:
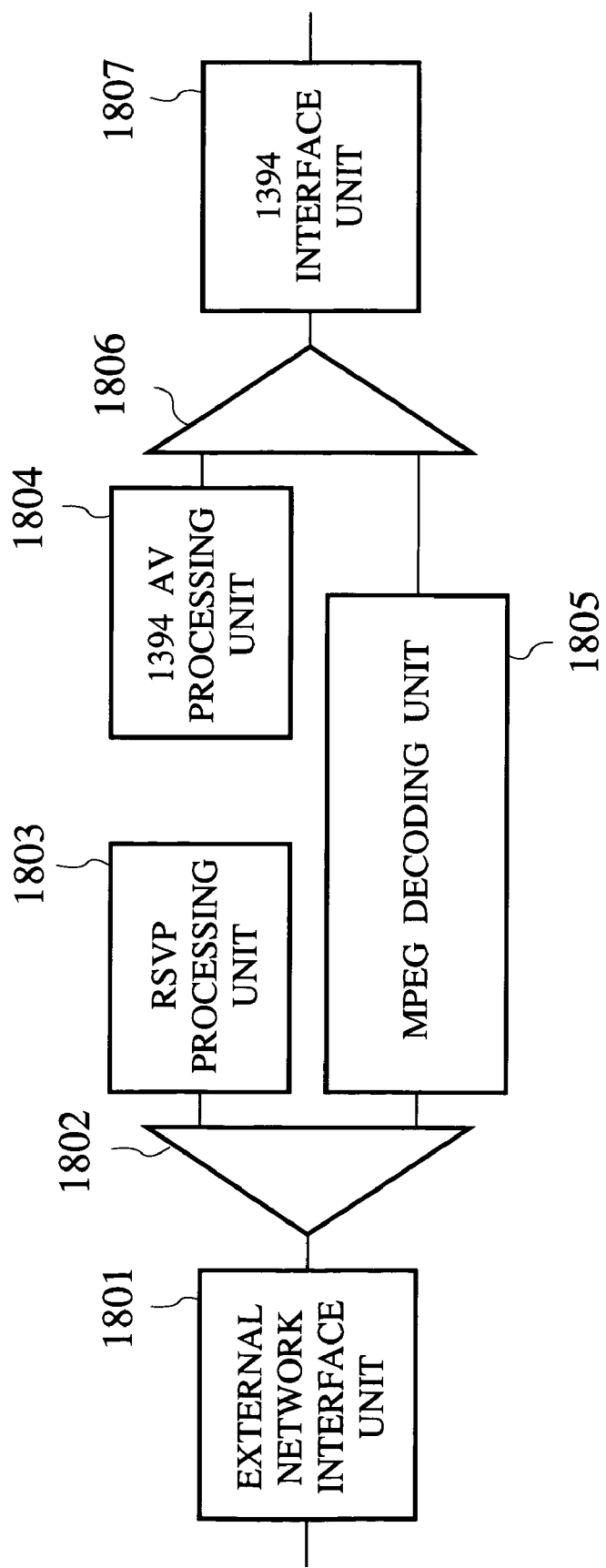
FIG. 16 is a block diagram showing another exemplary internal configuration of an AV control terminal in the communication network of FIG. 9, which has an MPEG decoding unit.
Figure 17:
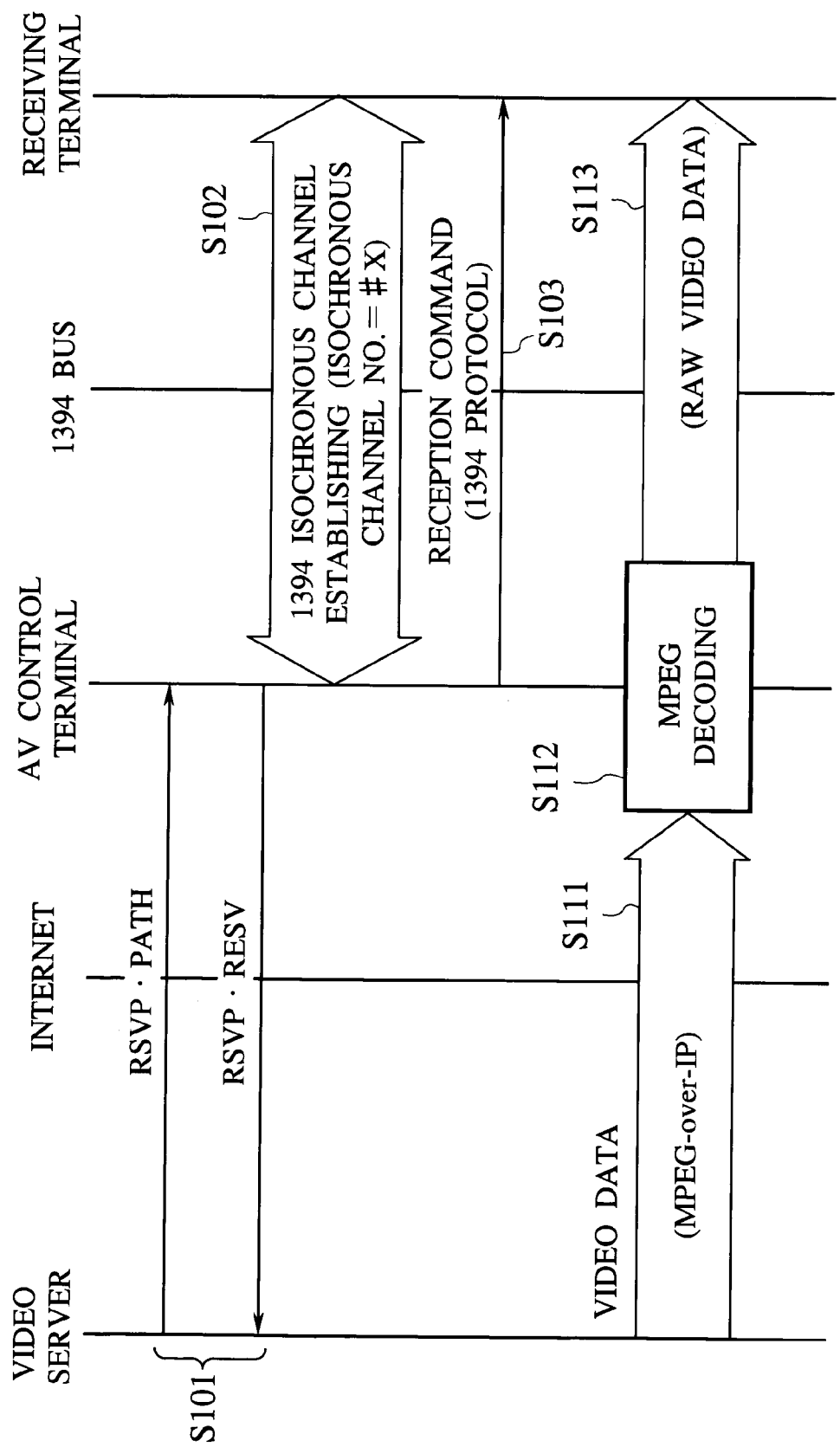
FIG. 17 is a sequence chart for an operation sequence in a case of transmitting video data from a video server to a receiving terminal in the communication network of FIG. 9 by using an AV control terminal of FIG. 16.

In such a case, in the communication network system of FIG. 9, for example, instead of carrying out the format conversion at the AV control terminal 1103, it is also possible to use a configuration in which, as shown in FIG. 16, an MPEG decoding unit 1805 is provided inside the AV control terminal 1103 and the MPEG decoding is carried out inside the AV control terminal 1103 for the MPEG-over-IP data (or the MPEG-over-ATM data, etc.) entered into the AV control terminal 1103, and the raw video data after the MPEG decoding are transmitted to the receiving terminal 1105 through the 1394 bus 1104. FIG. 17 shows the operation sequence in this case. Namely, FIG. 17 differs from FIG. 11 in that the step S104 to S105 of FIG. 11 are replaced by the step S111 to S113 in FIG. 17, where the format conversion is not carried out but the MPEG decoding of the MPEG-over-IP data (or the MPEG-over-ATM data, etc.) is carried out at the MPEG decoding unit 1805 and the raw video data are transmitted to the receiving terminal 1105 through the isochronous channel #X on the 1394 bus 1104 (step S111 to step S113 of FIG. 17).

By means of this, the high level functions such as the MPEG decoding are concentrated to the AV control terminal 1103, so that there is a merit in that a load on the receiving terminal 1105 can be reduced.

Also, FIG. 9 uses the Internet between the video server 1101 and the AV control terminal 1103, but the scheme of the present invention is of course not limited to a case of using the Internet and equally applicable to a case of using the other network configuration such as ATM network, SDH network, FTTH, etc.

Note that, as a configuration of the AV control terminal 1103, it is also possible to consider a configuration which is capable of processing a plurality of MPEG streams simultaneously. In this case, it is also possible to adopt the processing scheme in which the different processings are applied to different streams, as in a case of applying the MPEG decoding to one MPEG stream while applying the format conversion from the MPEG-over-IP to the MPEG-over-1394 to another MPEG stream, for example. In such a case, it suffices to provide a plurality of MPEG decoders, MPEG encoders, or conversion units inside the AV control terminal 1103.

Third Embodiment

Referring now to FIG. 18 to FIG. 25, the third embodiment of the present invention will be described in detail.

Figure 18:
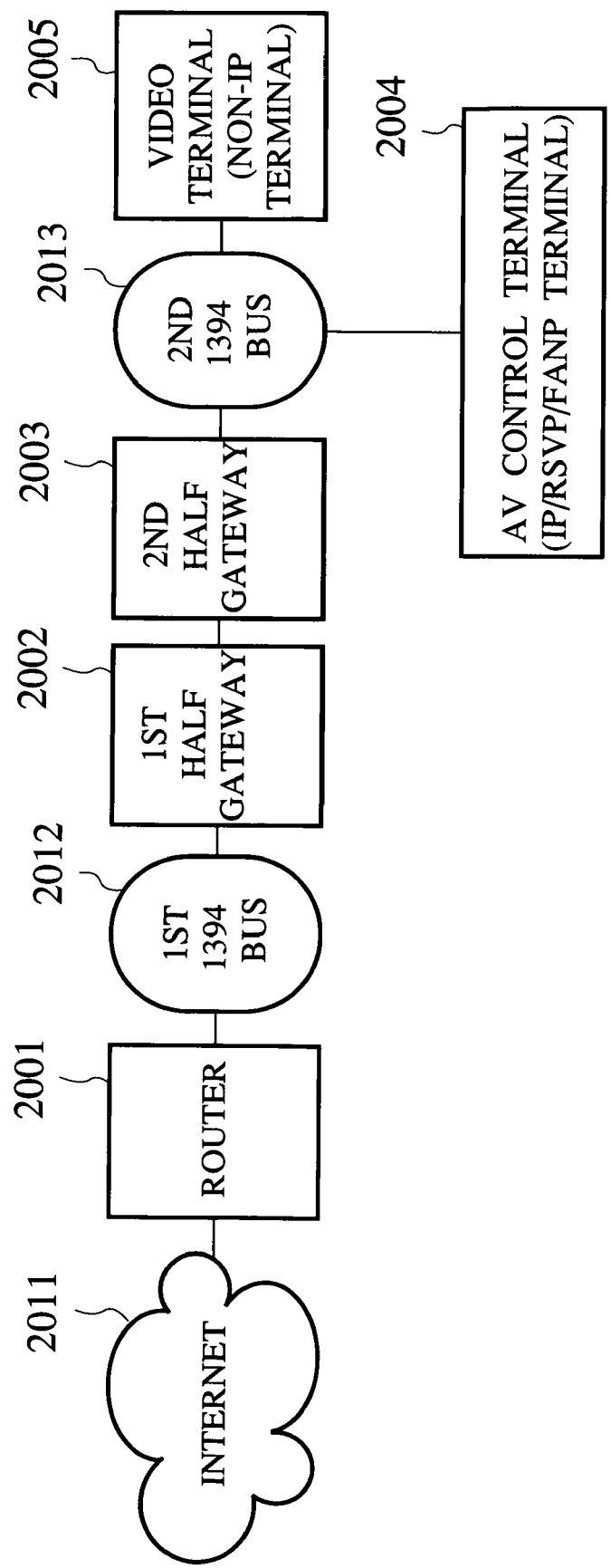
FIG. 18 is a block diagram showing an exemplary overall configuration of a communication network according to the third embodiment of the present invention, for a case of receiving video data from an external network at a video terminal on the home network.

FIG. 18 shows an exemplary overall configuration of a communication network system according to this third embodiment. As shown in FIG. 18, the communication network system of the third embodiment comprises a router 2001, a first half gateway 2002, a second half gateway 2003, an AV control terminal 2004, a video terminal 2005, an Internet 2011, a first 1394 bus 2012, and a second 1394 bus 2013.

In FIG. 18, a network formed by the router 2001 and elements on the right side of the router 2001 (that is, the router 2001, the first 1394 bus 2012, the first half gateway 2002, the second half gateway 2003, the second 1394 bus 2013, the AV control terminal 2004, and the video terminal 2005) may be a home network constructed within the home.

Also, in this embodiment the video terminal 2005 is a non-IP terminal, similarly as in the first embodiment.

Here, a case of receiving video data (assumed to be transmitted in the MPEG-over-IP format) from a video server (not shown) on the Internet 2011 at the video terminal 2005 which is the non-IP terminal will be considered.

Note that it is the AV control terminal 2004 that directly negotiate with the Internet or the video server by the IP, similarly as in the second embodiment.

This third embodiment differs from the second embodiment in that it is the second half gateway 2003 rather than the AV control terminal 2004 that carries out the control of transfer from the MPEG-over-IP to the MPEG-over-1394. Here, the control of transfer may be carried out by the first half gateway 2002 or the router 2001 instead of the second half gateway 2003, but a case where the control of transfer is carried out by the second half gateway 2003 will be described in this embodiment.

To this end, the AV control terminal 2004 is connected with the second 1394 bus 2013, but unlike the first embodiment, it is not absolutely necessary for this AV control terminal 2004 to be located on a path from the Internet 2011 to the video terminal 2005.

Also, here, the second half gateway 2003 may appear as a set-top box from a viewpoint of the video terminal 2005.

Also, in this embodiment, the bandwidth control between the subnets of the Internet (that is, at a boundary between one IP subnet and another IP subnet) is to be carried out by the RSVP, and the FANP described in the first embodiment is to be used within the subnet (that is, a portion of the elements on the right side of the router 2001). Consequently, the router 2001 and the AV control terminal 2004 are RSVP nodes while the router 2001, the first half gateway 2002, the second half gateway 2003, and the AV control terminal 2004 are FANP nodes.

The transmission scheme between the half gateways 2002 and 2003 is assumed to be the ATM similarly as in the first embodiment.

Now, with reference to FIG. 19, the video data transmission sequence will be described.

A user who wishes to receive the video transmitted from the Internet at the video terminal 2005 makes a program request by operating the AV control terminal 2004 similarly as in the second embodiment. Here, an actual operation screen may be displayed on a display device provided in the video terminal 2005. Also, at a time of this reservation, the reservation of the communication resources using the RSVP may also be carried out in order to receive the video program at a high communication quality. Consequently, the reservation of the communication resources by using an RESV message of the RSVP is carried out with respect to a PATH message of the RSVP transmitted from the Internet 2011 side (step S201). Note that the half gateways 2002 and 2003 are not the RSVP nodes so that the RSVP messages simply pass through them.

The router 2001 that received the RESV message reserves the connection and the communication resources on a route from the router 2001 to the AV control terminal 2004 by using the FANP described in the first embodiment. At this point, the fact that data to be transferred by the FANP are MPEG data may be notified to each node.

Figure 20:
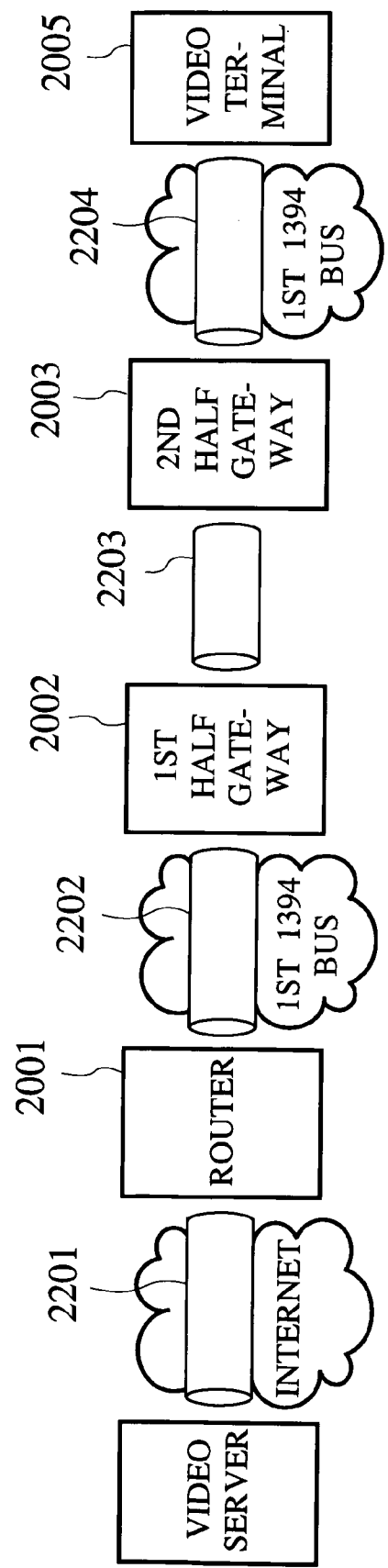
FIG. 20 is a diagram showing a communication route set up in the communication network of FIG. 18 according to the sequence of FIG. 19.

Here, suppose that the reserved communication resources includes, as shown in FIG. 20, an isochronous channel 2202 on the first 1394 bus, a connection 2203 between the half gateways 2002 and 2003, and an isochronous channel 2204 on the second 1394 bus. Here, the isochronous channel 2204 on the second 1394 bus is the broadcast on the second 1394 bus because of the property of the 1394 bus.

Now, the AV control terminal 2004 receives the FANP offer message transmitted from the router 2001 (step S202), and returns the FANP re-direct message (step S203) so as to permit the connection establishing. Also, around this point, the following two operations are carried out by the AV control terminal 2004.

The first operation is to command the video terminal 2005 to receive the isochronous data at the isochronous channel 2204, by using the 1394 protocol (step S204). By means of this, a state in which a connection with the communication quality guaranteed is established from the router 2001 to the video terminal 2005 of FIG. 20 is substantially realized.

The second operation of the AV control terminal 2004 is to command the second half gateway 2004 to carry out the format conversion from the MPEG-over-IP to the MPEG-over-1394 (step S205). Here, the MPEG-over-1394 format may be a format defined by IEC 61883, etc. In this case, the fact that the second half gateway 2003 has the transfer function in advance may be already recognized by the AV control terminal 2004, or some protocol for the purpose of checking the presence/absence of the transfer function may run through the network.

This transfer command may be made in a form of the IP application, or in a form of the 1394 application. For this reason, the second half gateway 2003 has an internal function for transferring from the MPEG-over-IP to the MPEG-over-1394 (the MPEG-over-1394/MPEG-over-IP conversion unit 2304 of FIG. 21).

Figure 19:
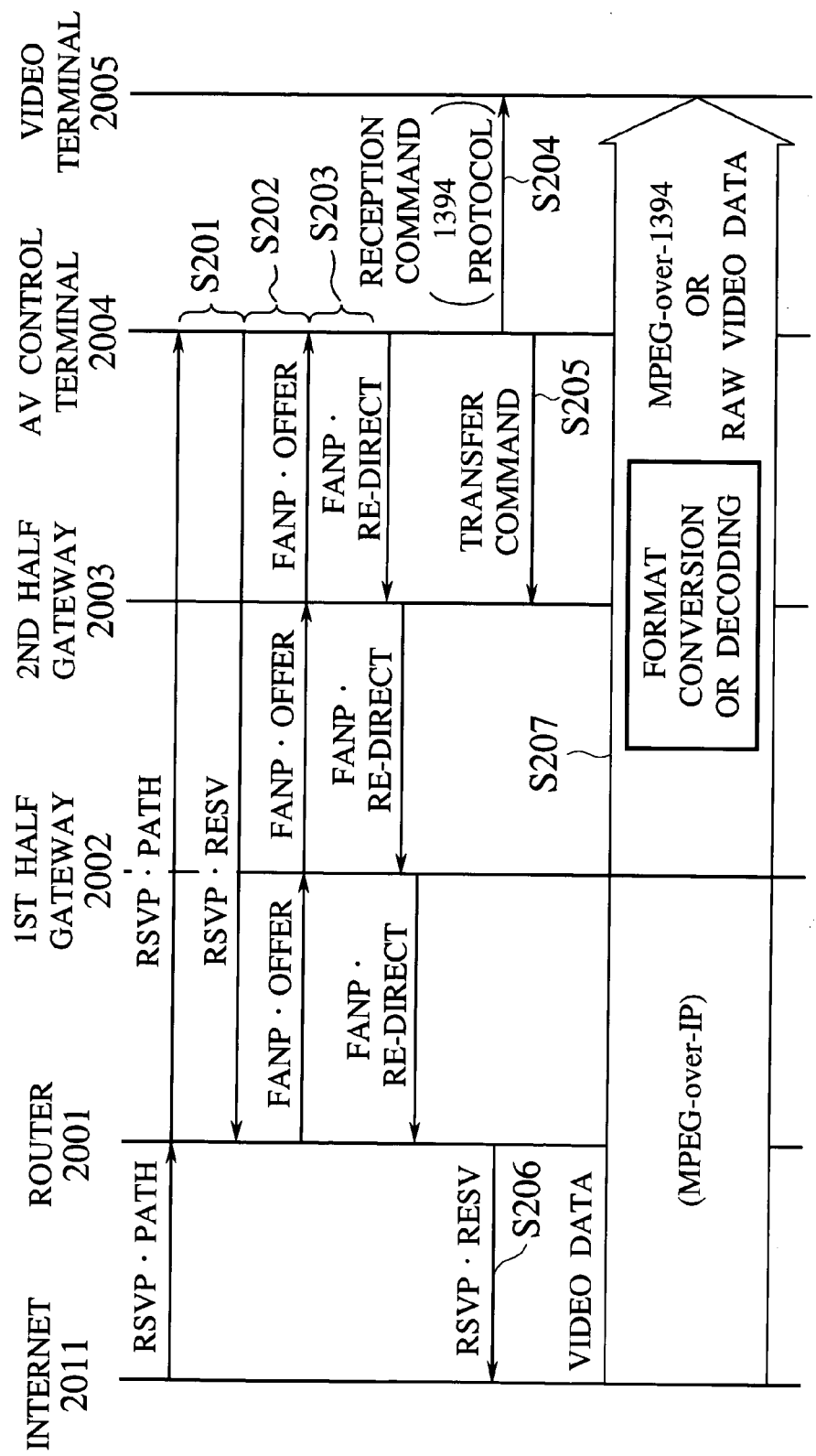
FIG. 19 is a sequence chart for an operation sequence in a case of transmitting video data from a transmitting terminal (on the Internet) to a receiving terminal (on the home network) in the communication network of FIG. 18.
Figure 21:
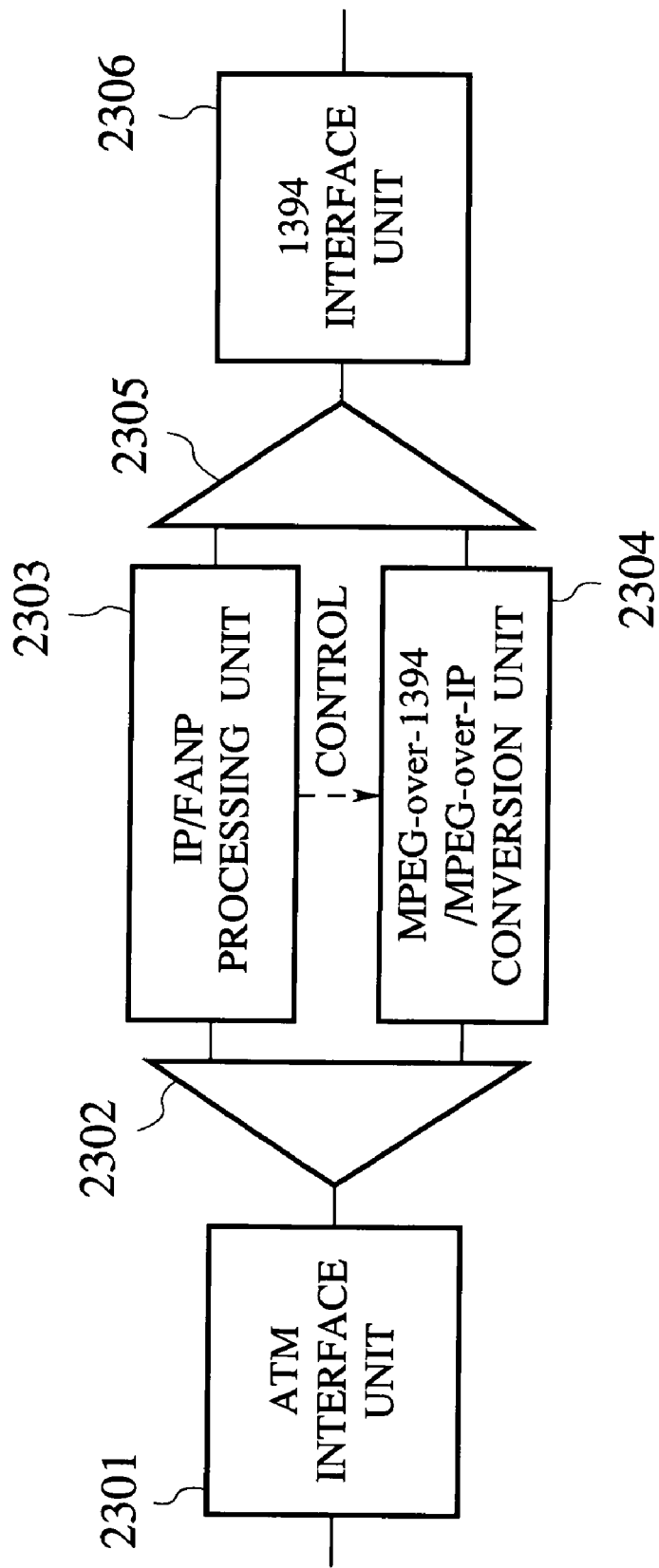
FIG. 21 is a block diagram showing one exemplary internal configuration of a half gateway in the communication network of FIG. 18.

The internal configuration of the second half gateway 2003 shown in FIG. 21 differs from the internal configuration of the half gateway in the first embodiment in that the MPEG-over-1394/MPEG-over-IP conversion unit 2304 is included in the second half gateway 2003, and that the IP/FANP processing unit 2303 has a function for making a setting of the MPEG-over-1394/MPEG-over-IP conversion unit 2304 according to a "transfer command" signal at the step S205 in the sequence of FIG. 19, so that the format conversion from the MPEG-over-IP to the MPEG-over-1394 will be carried out for appropriate input IP packets on which the MPEG data are mounted.

Now, the RESV message of the RSVP that reached to the router 2001 flows further to an upstream side and reaches to the video server (now shown) (step S206). At this point, the end-to-end connection with the communication quality guaranteed is established from the video server to the video terminal 2005 as shown in FIG. 20. Here, prior to the video data transmission, some notification signal (a signal for urging the video data transmission) may be sent from the AV control terminal 2004 to the video server.

After that, the transmission of the video data from the video server is started (step S207). The video data pass through the connection set 2201 on the IP of FIG. 20, and reaches to the video terminal 2005 through the connections 2202, 2203 and 2204 established by the FANP. Note here that the format conversion from the MPEG-over-IP format to the MPEG-over-1394 format is carried out at the second half gateway 2003.

The above description is directed to a case where the video terminal 2005 has the MPEG decoder. In contrast, in a case where the video terminal 2005 does not have the MPEG decoder and is in a configuration for receiving and reproducing the raw video data, it is also possible to use a configuration in which the MPEG decoder is provided in the second half gateway 2003 so that the MPEG decoding from the MPEG-over-IP is carried out and the obtained raw video data are transmitted to the video terminal 2005. In this configuration, there is no need to implement the expensive MPEG decoder in the video terminal 2005, so that there is a merit in that a construction of a low cost system becomes possible.

Figure 22:
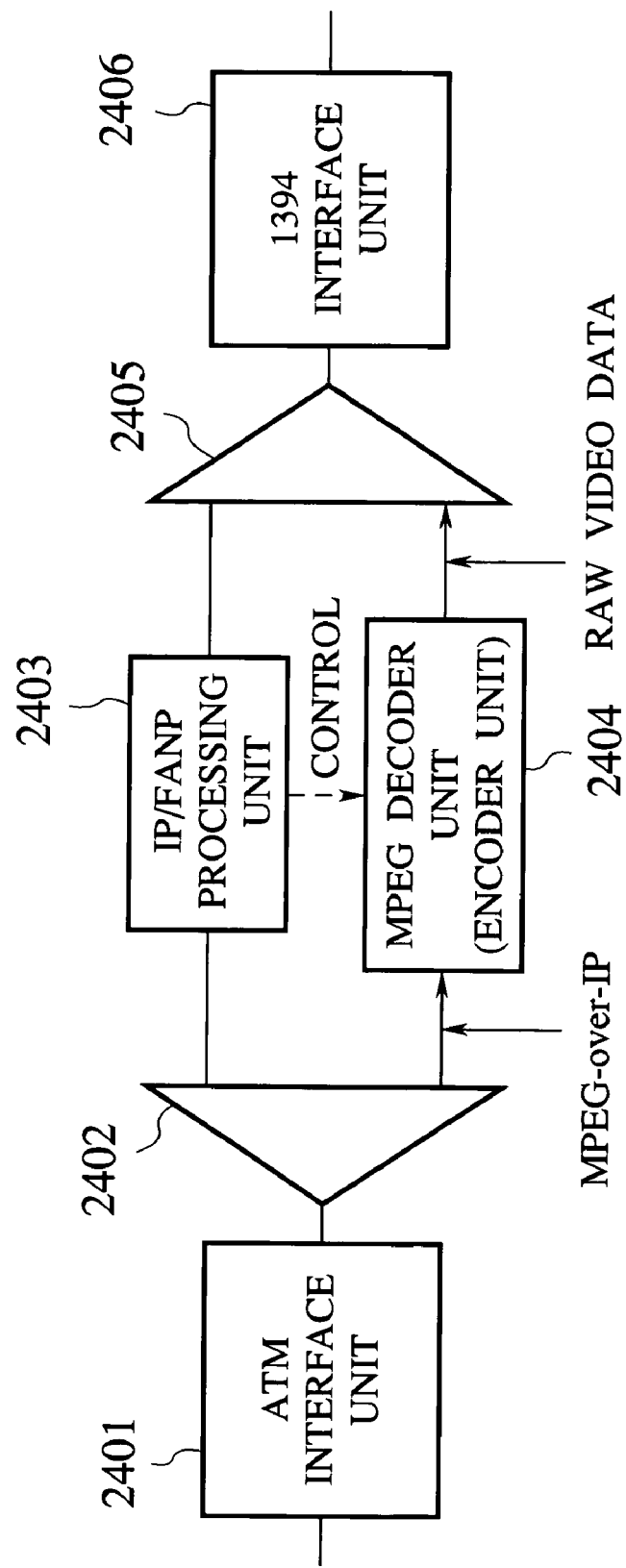
FIG. 22 is a block diagram showing another exemplary internal configuration of a half gateway in the communication network of FIG. 18.

FIG. 22 shows an exemplary internal configuration of the second half gateway 2003 in this case. This configuration of FIG. 22 differs from that of FIG. 21 in that the MPEG decoder unit 2404 is provided instead of the MPEG-over-1394/MPEG-over-IP conversion unit 2304 of FIG. 21.

At the MPEG decoder unit 2404, the MPEG decoding may be carried out when a command signal for commanding the decoding of the MPEG data is sent from the AV control terminal 2004 to the second half gateway 2003.

Here, in a case of carrying out the MPEG format conversion or the MPEG decoding, the format conversion or decoding processing may be carried out by implicitly recognizing that data contents are MPEG data from the value of the datalink identifier (VPI/VCI value in a case of the ATM, for example) between the two half gateways 2002 and 2003, without carrying out the IP layer processing. In this manner, it is possible to start the MPEG format conversion processing or the MPEG decoding processing by omitting the IP processing which is generally said to be costly, so that the quick processing and the low cost can be realized simultaneously.

Note that, as should be apparent, the system in such a configuration is applicable not only to a case of receiving video from the Internet but also to a case of the video data transmission by the MPEG-over-ATM when the access network is the ATM network as in the second embodiment, or to cases using any other transmission schemes.

Also, the transmission of video data (or data in general) is not necessarily limited to the MPEG, and any coding scheme can be used.

Figure 23:
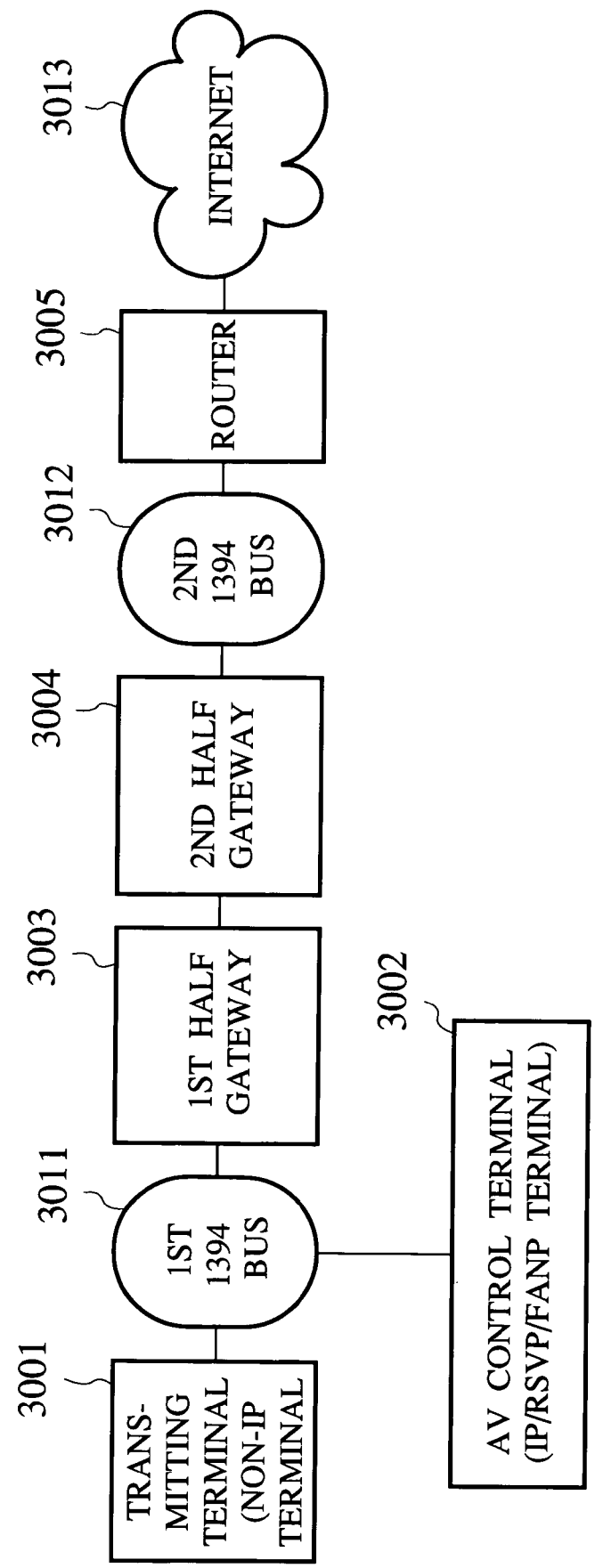
FIG. 23 is a block diagram showing another exemplary overall configuration of a communication network according to the third embodiment of the present invention, for a case of transmitting video data to an external network from a video terminal on the home network.

Also, the above operations can be utilized for the information transmission from the home. Namely, in the communication network system with a configuration as shown in FIG. 23, consider a case of transmitting the raw video data or MPEG data from the transmitting terminal 3001 which is the non-IP terminal.

Basically, it suffices to carry out the sequence opposite to that of the receiving described above (see the sequence shown in FIG. 25). Namely, the AV control terminal 3002 establishes a connection up to the receiving terminal by the signaling protocol of the network layer (step S301), transmits the isochronous channel number, etc., to the router 3005 by the FANP offer message (step S302), and receives the re-direct message from the router 3005.

Also, the AV control terminal 3002 commands the transmitting terminal 3001 to transmit data through the earlier set up isochronous channel, by using the 1394 protocol (step S304), and in addition a command for transfer (or MPEG encoding) is sent from the AV control terminal 3002 to the first half gateway 3303 for example (step S305).

Figure 24:
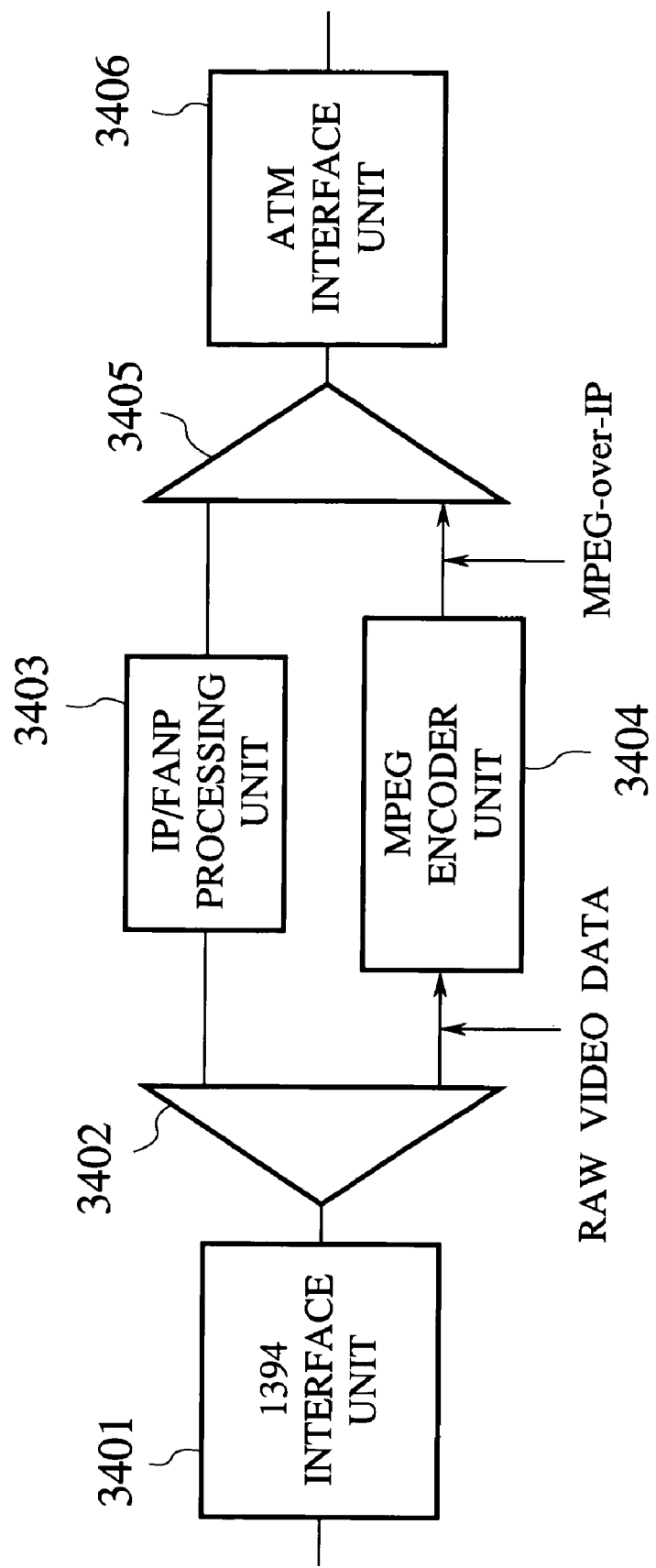
FIG. 24 is a block diagram showing an exemplary internal configuration of a half gateway in the communication network of FIG. 23.
Figure 25:
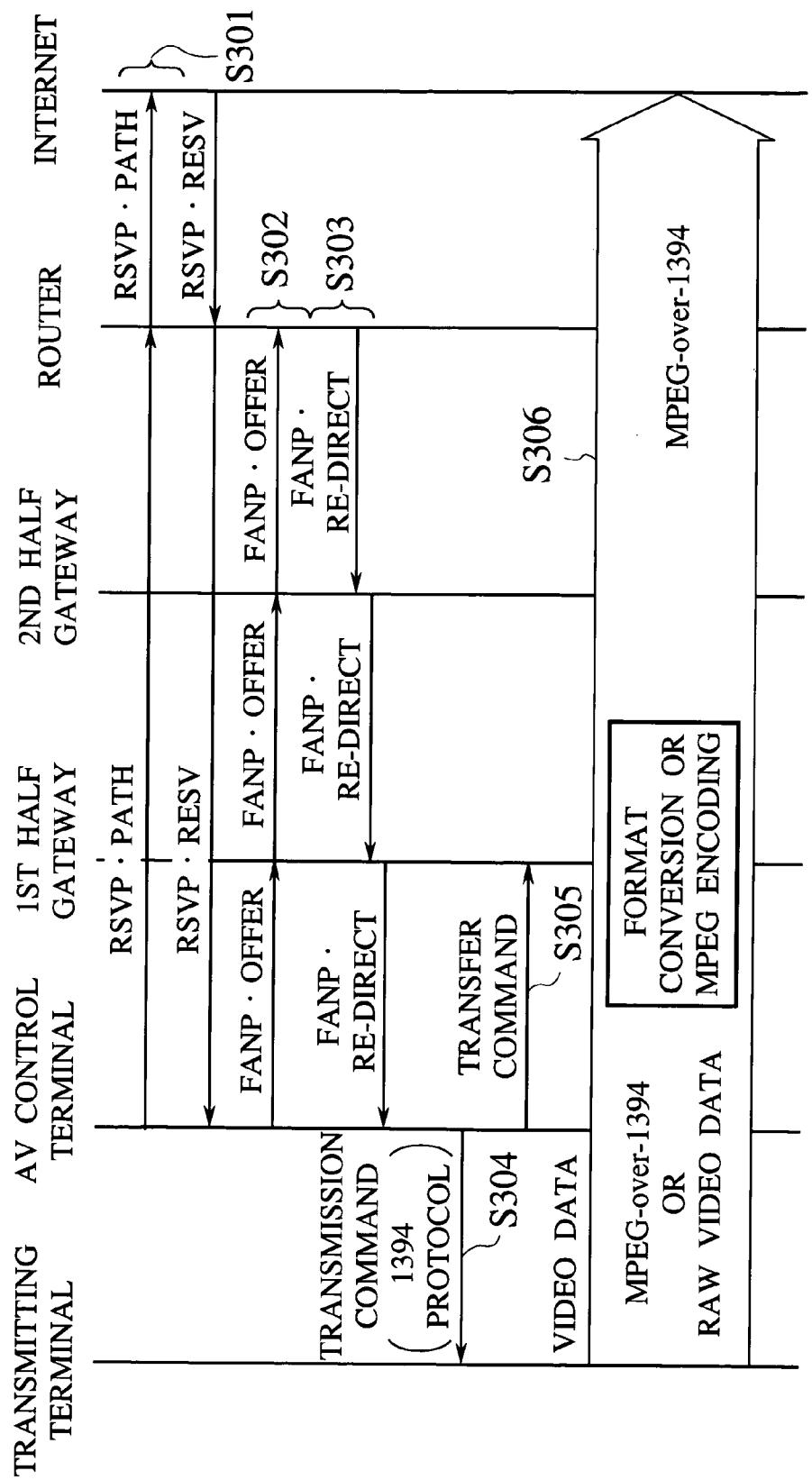
FIG. 25 is a sequence chart for an operation sequence in a case of transmitting video data from a transmitting terminal (on the home network) to a receiving terminal (on the Internet) in the communication network of FIG. 23.

By means of this, when the MPEG encoder unit 3404 as shown in FIG. 24 (in a case where the MPEG encoder is not provided in the transmitting terminal 3002) or the function of the format conversion from the MPEG-over-1394 to the MPEG-over-IP (the MPEG-over-1394/MPEG-over-IP conversion unit 2304) as shown in FIG. 21 is provided at the first half gateway 3003, it becomes possible to carry out the data transmission from the transmitting terminal 3001 (step S306).

Note that, by incorporating the MPEG encoder unit 3404 (for encoding video data transmitted from the 1394 side toward the ATM side) of the half gateway in the configuration shown in FIG. 24 into the half gateway in the configuration shown in FIG. 22 so that the MPEG encoder and the MPEG decoder are provided simultaneously, it becomes possible to carry out the bi-directional communications by a single device (half gateway). It is obviously also possible to use this device in such a manner that two or more uni-directional communications are carried out simultaneously and the encoder and the decoder are used for the respective communications independently.

It is also possible to consider a configuration in which the MPEG encoding function, the MPEG decoding function, and the MPEG format conversion function are provided separately, and necessary ones of these functions are executed by the mode switching according to an appropriate control signal from the AV control terminal 3002.

It is also possible to consider a configuration which is capable of processing a plurality of MPEG streams simultaneously. In this case, it is also possible to adopt the processing scheme in which the different processings are applied to different streams, as in a case of applying the MPEG decoding to one MPEG stream while applying the format conversion from the MPEG-over-IP to the MPEG-over-1394 to another MPEG stream, for example.

Fourth Embodiment

Referring now to FIG. 26 to FIG. 32, the fourth embodiment of the present invention will be described in detail.

This fourth embodiment is directed to a case where a receiving terminal is a terminal with a low internal network processing power which does not have a full capability for autonomously carrying out a series of TCP/IP protocol processing.

In this case, dynamic IP address or application receiving processing for the terminal is realized in such a manner that a separate control node connected to the same home network carries out the reservation of communication resource, handling of multicast protocol, handling of upper layer protocol, etc., on behalf of this terminal, and exchanges protocols characteristic to the fourth embodiment with this terminal.

Figure 26:
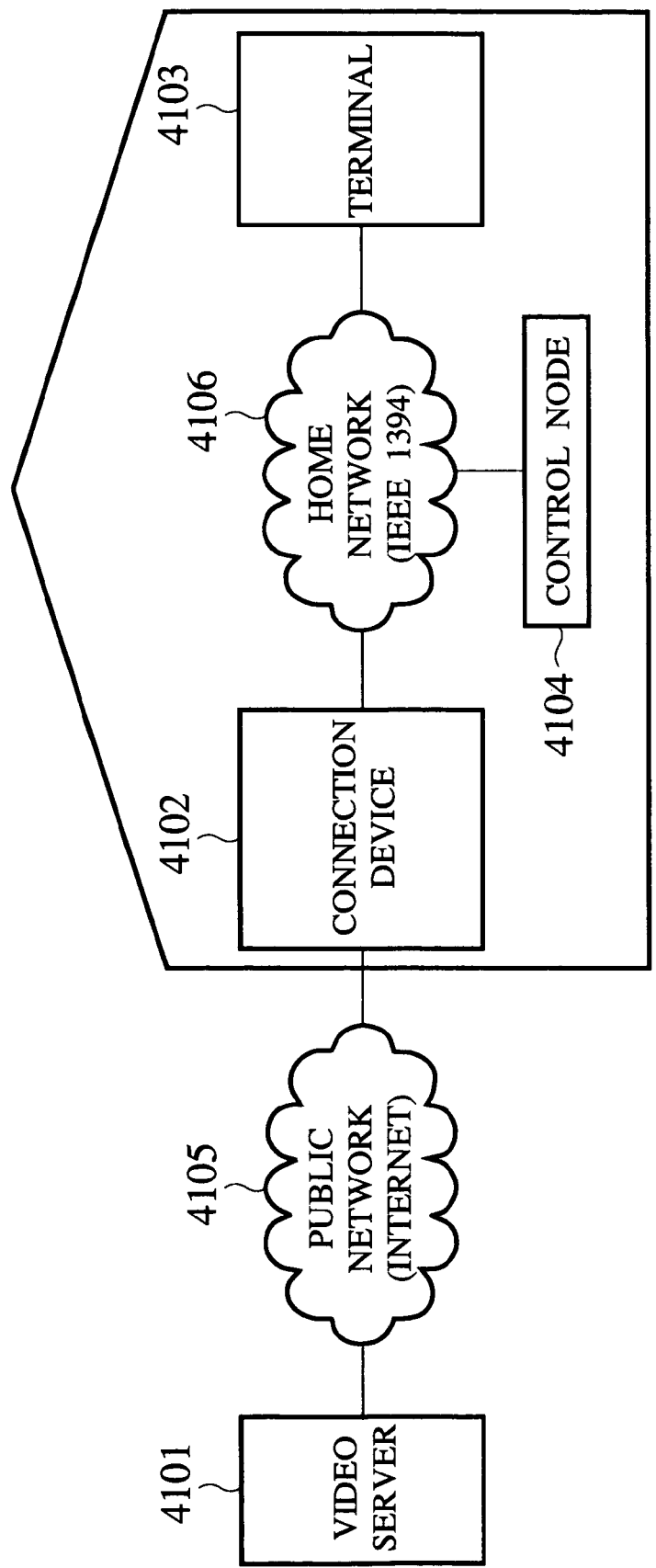
FIG. 26 is a block diagram showing an exemplary overall configuration of a network system according to the fourth embodiment of the present invention.

FIG. 26 shows an exemplary overall configuration of a network system according to this fourth embodiment, for an exemplary case of taking data from a video server that is providing a video service into a home network through a public network such that the video service is received at a terminal connected to the home network.

As shown in FIG. 26, this network system comprises a video server 4101, a public network (Internet) 4105, a connection device 4102, a home network (IEEE 1394) 4106, a terminal 4103 connected to the home network 4106, and a control node 4104 connected to the home network 4106. Note that FIG. 26 shows an exemplary case of connecting only one terminal 4103 to the home network 4106, but it is possible to connect various types of terminals to the home network 4106 in practice.

The public network 4105 can be provided in various forms including CATV network, ISDN/B-ISDN network, ATM-PON network, high speed radio access network, ADSL/HDSL network, etc., but it is assumed in this fourth embodiment that the video service provides MPEG video data through Internet (MPEG-over-IP). Consequently, an interface through which this service is provided is assumed to be a digital interface.

In the following description, it is assumed that this digital network adopts ATM scheme as its datalink scheme, but the present invention is not limited to this particular case of using ATM scheme alone. For example, a datalink layer identifier such as VPI/VCI of ATM appearing in the following description corresponds to a B-channel identifier in the case of ISDN, or a frequency in the case of CATV. Thus the present invention encompasses those cases where VPI/VCI of ATM is replaced by any such other datalink layer identifier.

The video server 4101 can be a dedicated video server or a server that is capable of transmitting video signals such as a video handling WWW server for example. Here, "capable of transmitting video signals" does not necessarily implies a capability of real time transmission. For example, a case of delivering video data by best effort rather than real time delivery can be included.

The public network 4105 and the home network 4106 are connected at a dedicated connection device 4102. In this case, the connection device 4102 has a function for terminating the public network 4105, a function for terminating the home network 4106, an IP processing function, a NAT (Network Address Translation) function which is standardized by RFC 1631, as well as an IP multicast handling function, an IP signaling function, a datalink layer level switch capable of realizing real time data transfer between the public network 4105 and the home network 4106, and an address notification function, as will be described in detail below.

The control node 4104 carries out exchanges of control with the public network (Internet) 4105 on behalf of the terminal 4103, and notifies IP address, port number, application type, etc., to be received to the terminal 4103.

The terminal 4103 basically has an IP packet receiving function and a function for processing packets of a pre-scribed format. For example, when the terminal 4103 is an MPEG video receiving terminal, the terminal 4103 has a function capable of receiving MPEG-over-IP packets.

Such limited functions can be realized by minor hardware or firmware modification on existing digital AV devices based on a series of 1394 protocols (IEEE 1394-1995 spec., IEC 61883, AV/C protocol, etc.). Here, however, the terminal 4103 is also required to have a new function that is not used conventionally, that is a function for receiving an information on IP flow to be received, i.e., a notification of IP address, port number, application type, etc., as notified from the control node 4104, and setting itself accordingly, which will be described in detail below.

Figure 27:
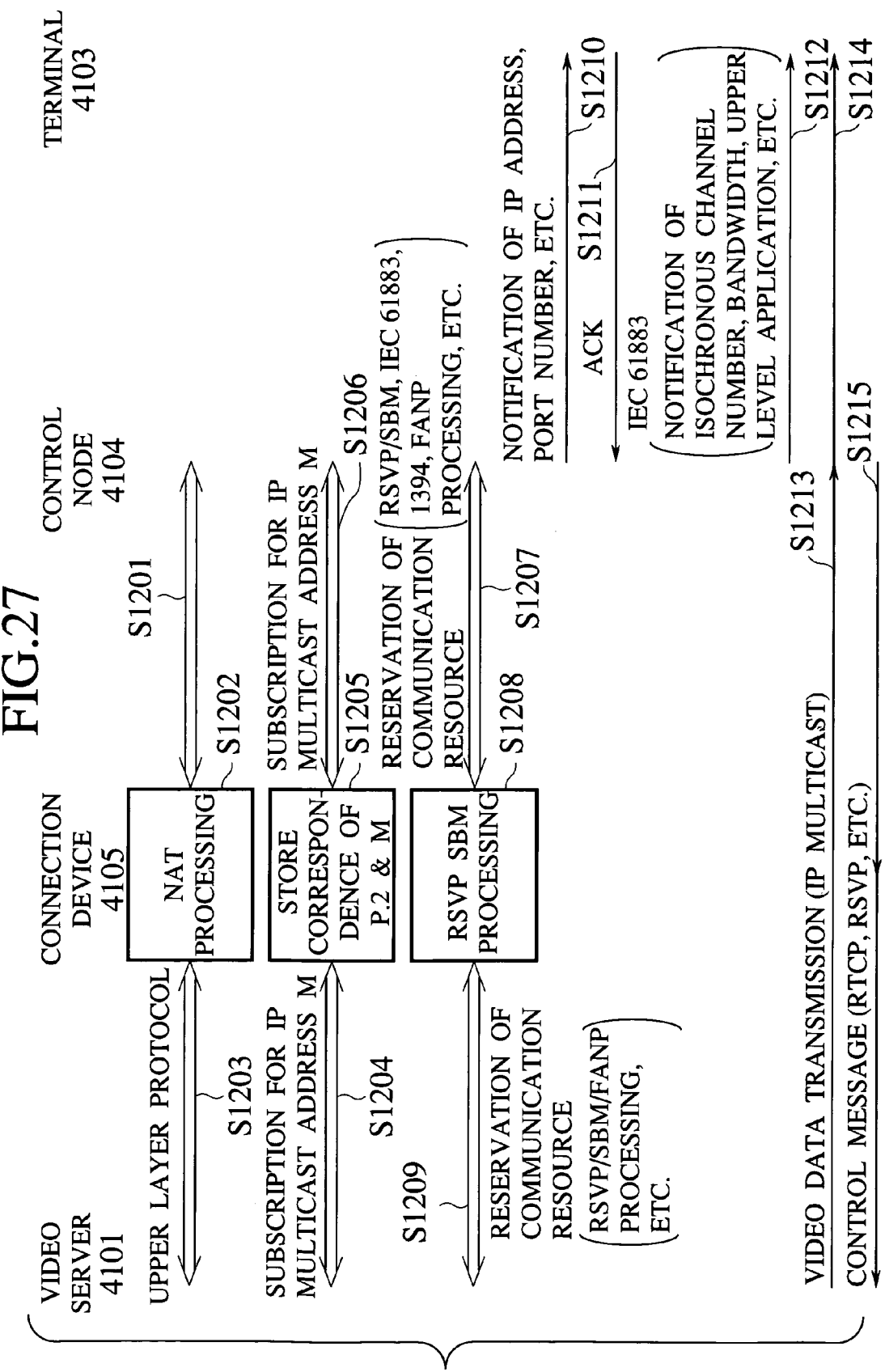
FIG. 27 is a sequence chart for a processing in the system of FIG. 26 in a case of video transfer from a video server to a terminal.

FIG. 27 shows a processing sequence in a case of carrying out video transfer from the video server 4101 to the terminal 4103. Here, basically, it is assumed that the video service such as that of MPEG is provided through IP multicast.

Figure 28:
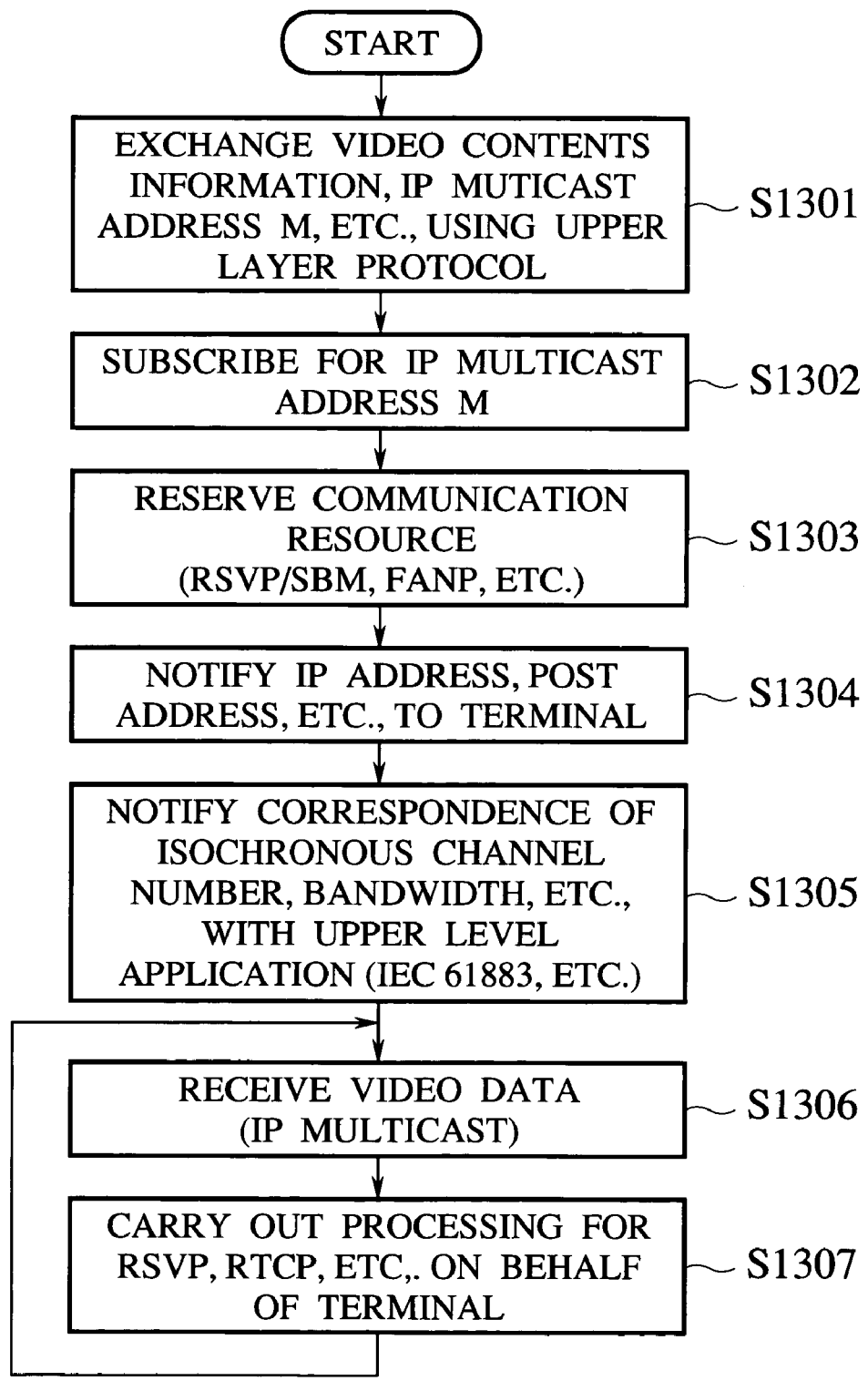
FIG. 28 is a flow chart for a processing by a control node in the system of FIG. 26 in a case of video transfer from a video server to a terminal.
Figure 29:
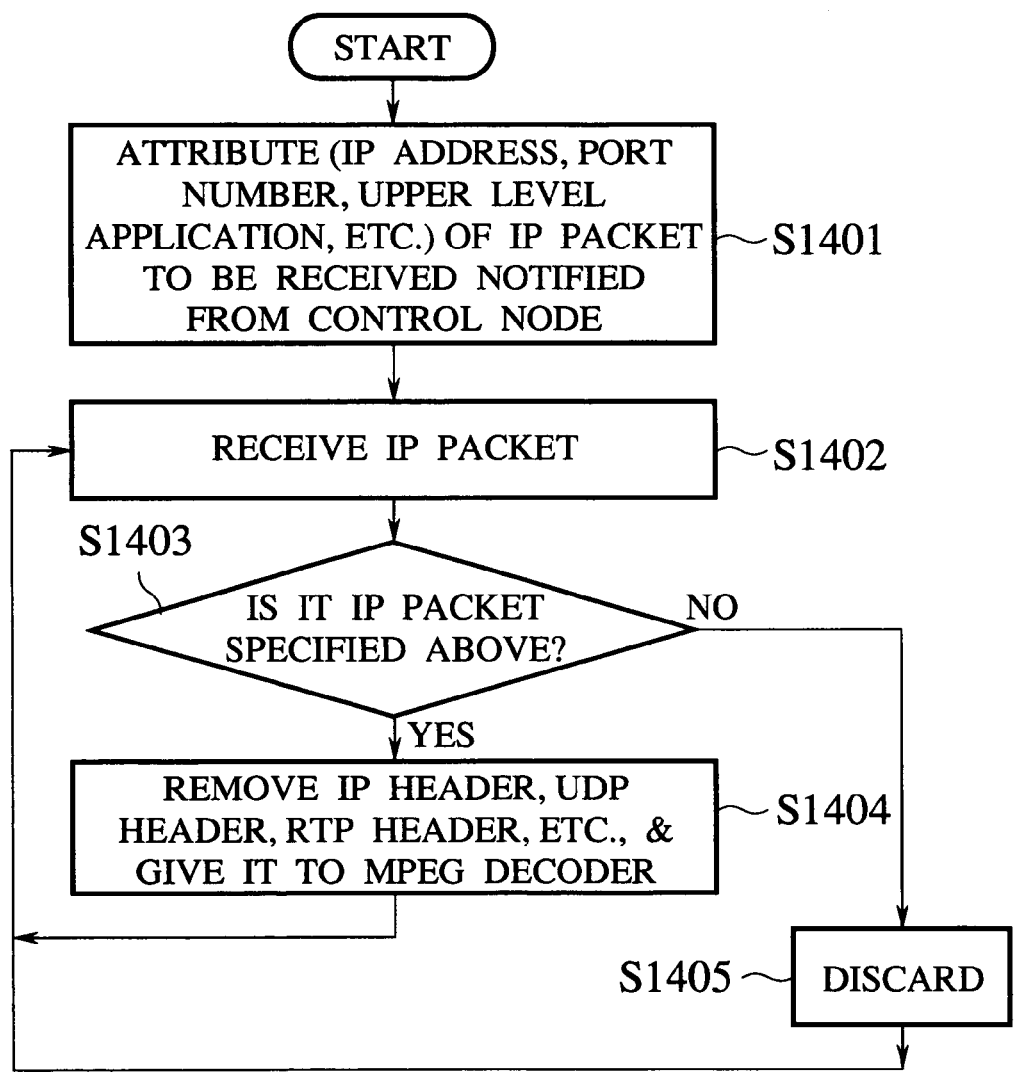
FIG. 29 is a flow chart for a processing by a terminal node in the system of FIG. 26 in a case of video transfer from a video server to a terminal.

FIG. 28 shows a flow chart for a processing of the control node 4104, and FIG. 29 shows a flow chart for a processing of the terminal 4103.

First, the control node 4104 obtains information on program content and IP multicast address through an upper layer protocol (steps S1201 to S1203 of FIG. 28, step S1301 of FIG. 29). More specifically, the control node 4104 obtains information on a desired video using a protocol above layer 5 among seven layers standardized by OSI. This can be realized in various manners such as a negotiation using DSM-CC of MPEG/DAVIC or corresponding protocol, an information selection for selecting information from the WWW server on Web using RTSP, etc. In this fourth embodiment, these various manners are collectively referred to as an upper layer protocol, and it is assumed that the exchange of this information is realized by using IP packets.

Next, the subscription for the notified IP multicast address through IGMP (Internet Group Management Protocol), etc., is made (step S1204 to S1206 of FIG. 28, step S1302 of FIG. 29). More specifically, the video server 4101 notifies a multicast address "M" to be used for video transfer to the control node 4104 through the upper layer protocol. Then, the control node 4104 transmits a REPORT message for the multicast address "M" to be subscribed for, in response to a QUERY message received from Internet side, according to the IP multicast protocol (such as IGMP (RFC 1112) for example).

Then, using various protocols such as RSVP, SBM, FANP, Q.2931, IEEE 1394, IEC 61883, etc., the reservation of communication resource from the video server 4101 up to the home network 4106 is made (steps S1207 to S1209 of FIG. 28, step S1302 of FIG. 29).

In parallel to this reservation of communication resource, the control node 4104 notifies a type of IP packet to be received at the terminal 4103 to the terminal 4103 (step S1210 of FIG. 27, step S1304 of FIG. 29).

Here, it is assumed that the IP multicast address "M" which is a destination IP address, a source IP address "G.1", a source port number "S0", a destination port number "S1", an application type (MPEG-over-IP), etc., are to be notified. In this fourth embodiment, the home network 4106 is assumed to be IEEE 1394, so that this notification can be realized in form of writing into a register within the terminal 4103. In that case, it is assumed that the terminal 4103 is set to temporarily receive IP packets having IP flow attribute written into that register. When the home network 4106 is formed by an Ethernet, for example, it is possible to realize this notification by exchange of a packet such as BOOTP (Bootstrap Protocol) instead of the writing into a register.

The terminal 4103 has a function to receive those IP packets which have attribute written into that register. This function can be realized, for example, by setting the terminal 4103 such that every IP packet having attribute other than that written in that register is always to be discarded and every IP packet having attribute written in that register is to be received without returning a control packet (which can be a packet carrying a message of a protocol for error control within IP protocol such as ICMP (Internet Control Message Protocol) for example).

Also, when the application type is notified as MPEG-over-IP, for example, there are cases where the terminal 4103 can recognize in advance a format by which MPEG data are to be transmitted by IP packets. For example, a case of transmitting MPEG data using RTP is such a case, in which a format prediction is possible because a transmission formation for MPEG data is specified by IETF. In such a case, it is not necessarily required to analyze each received data, and it is possible to adopt a scheme that simply extract MPEG frames by removing IP header, UDP header and RTP header, and give them as they are to an MPEG decoder. At this point, a transmission of a reception information of RTCP (Realtime Transport Control Protocol) is carried out by the control node 4104 so that there is no need for the terminal 4103 to do that. Here, RTCP is the layer 4 and 5 protocol, which deals with flow control, session control and so on.

The terminal 4103 simply carries out the receiving of the above described IP packets alone. With this provision, it becomes possible to simplify the configuration of the terminal to a very simple one having only an IP receiving function as described above, under an environment in which data transfer other than that by IP packets is difficult as the network is inter-connected with the home network, the public network, etc., in contrast to a conventional scheme where the terminal was required to be provided with a complicated mechanism for receiving and processing IP packets by means of software. Consequently, a construction cost for the terminal under the inter-connected network environment can be reduced considerably. This is an effect that can be realized by exchanging necessary information on IP address, port number, application type, etc., between the control node and the terminal.

Now, in parallel to this notification of IP address, etc., the control node 4104 may register an isochronous channel, its bandwidth information, etc., by which reserved MPEG frames will be transferred by being encapsulated in IP packets, into a PCR (Plugs Control Register of IEEE 1394) of the terminal 4103 using IEC 61883 protocol (step S1212 of FIG. 27, step S1305 of FIG. 28, step S1401 of FIG. 29). Then, video data destined to the IP multicast address "M" are transferred in forms of MPEG-over-IP through the connection device 4102 (steps S1213 to S1214 of FIG. 27, step S1306 of FIG. 28, step S1402 of FIG. 29).

On the other hand, the control node 4104 plays a role of returning responses to the sender side using a protocol such as RTCP (step S1215 of FIG. 27, step S1307 of FIG. 28), and it suffices for the terminal 4103 to just receive MPEG-over-IP data.

As shown in the flow chart of FIG. 29, the terminal 4103 receives an arrived IP packet without discarding it if it is destined to the IP multicast address "M" (steps S1403 and S1405 of FIG. 29). Then, as the terminal 4103 recognizes in advance that the received packet is MPEG-over-IP according to IEC 61883, the terminal 4103 just decapsulates the received packet according to the prescribed format, re-assembles MPEG frames, and reproduces MPEG data (step S1404 of FIG. 29).

This terminal 4103 continues to use that IP address (IP multicast address "M" in this embodiment) either while this IP address or the like is registered in the above described register, or while the control node 4104 continues to regularly send a protocol packet similar to BOOTP to the terminal 4103. Namely, this embodiment adopts a mechanism by which a state of the receiving IP address or the like is set to be a soft state just like RSVP protocol, etc., and the terminal 4103 is going to stop receiving IP packets destined to that attribute (IP address or the like) when there is no notification for a prescribed period of time, so as to prevent that address from being registered forever at that terminal 4103 due to a cause such as a trouble in the control node 4104.

With this mechanism just described, it is also possible to temporarily give an IP address other than IP multicast address to the terminal 4103.

Figure 30:
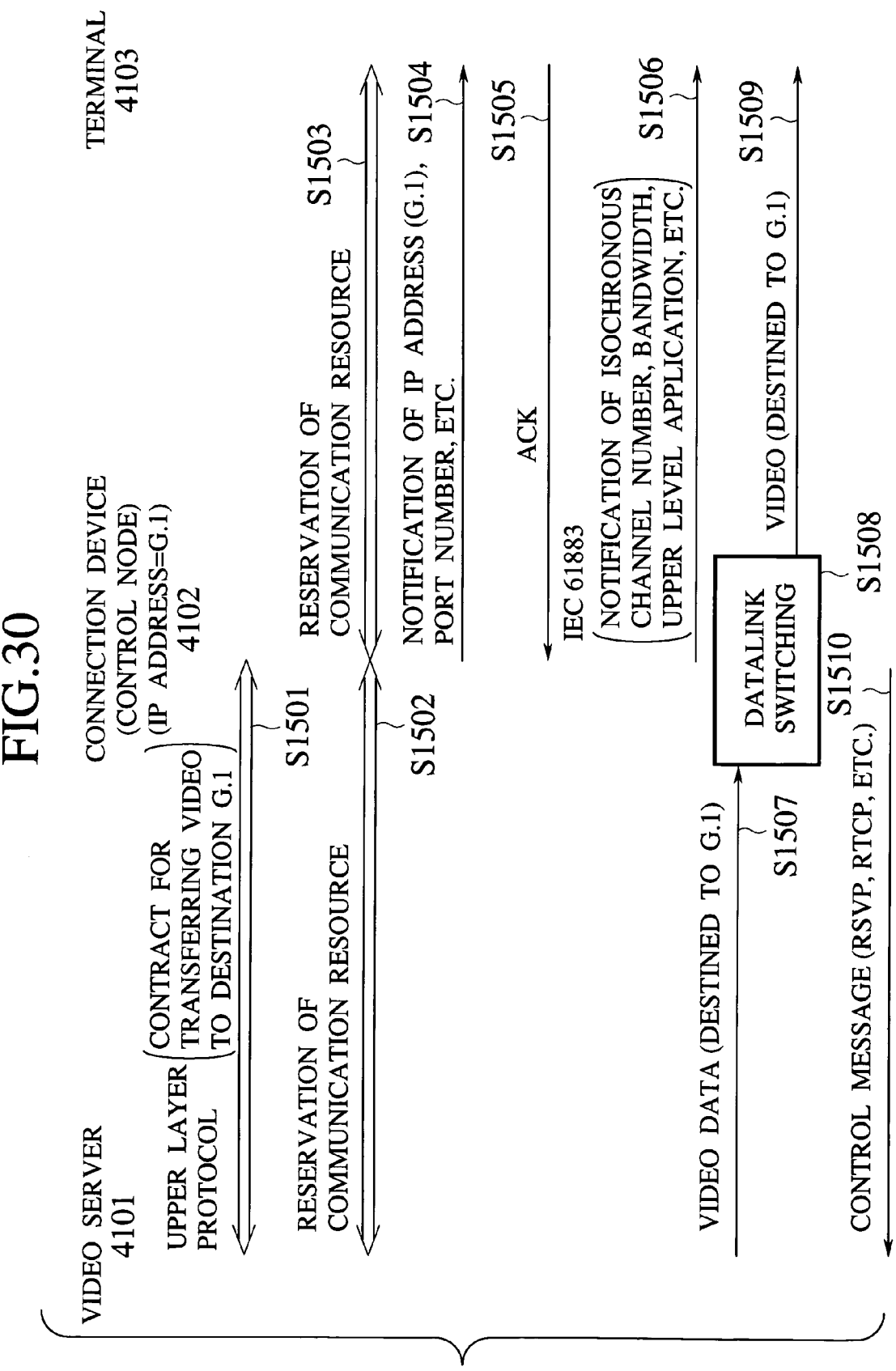
FIG. 30 is a sequence chart for a processing by a terminal in the system of FIG. 26 in a case of video transfer from a video server to a terminal using a global IP address of a control node (connection device), based on IP address and port number notification from a control node to a terminal.

For example, when the control node is the connection device 4102 which alone has a global IP address as shown in FIG. 30, it is possible to make the terminal 4103 to temporarily use (receive) an IP address (global IP address) of the control node itself.

Also, in a case where the global IP address enters into the private network (home network) as the switching of the received packet in the datalink layer is carried out at the connection device 4102, the address translation (NAT processing) within the connection device 4102 can be made dispensable by making the terminal 4103 to temporarily receive the global IP address. In this case, the receiving of IP packets destined to that global IP address is the only processing in which the terminal 4103 uses the global IP address, and these IP packets will be transmitted to that terminal 4103 alone. Moreover, there is no need for that terminal 4103 to carry out the IP packet transmission processing using that global IP address. For this reason, no overall contradiction (such as that in which two or more terminals uses the same global IP address as a source address simultaneously) will be caused.

In addition, it becomes possible to realize a high speed switching using only the datalink layer information within the connection device 4102 rather than the IP routing, so that it is possible to expect a considerable improvement in efficiency of the switching mechanism within the connection device 4102 under an environment where a high speed switching is required as in a case of video, compared with a case of doing this by the IP layer processing. Consequently, it is possible to realize this switching mechanism at considerably reduced cost.

Next, with reference to FIG. 31, another way of using the IP address and port number notification protocol will be described.

Figure 31:
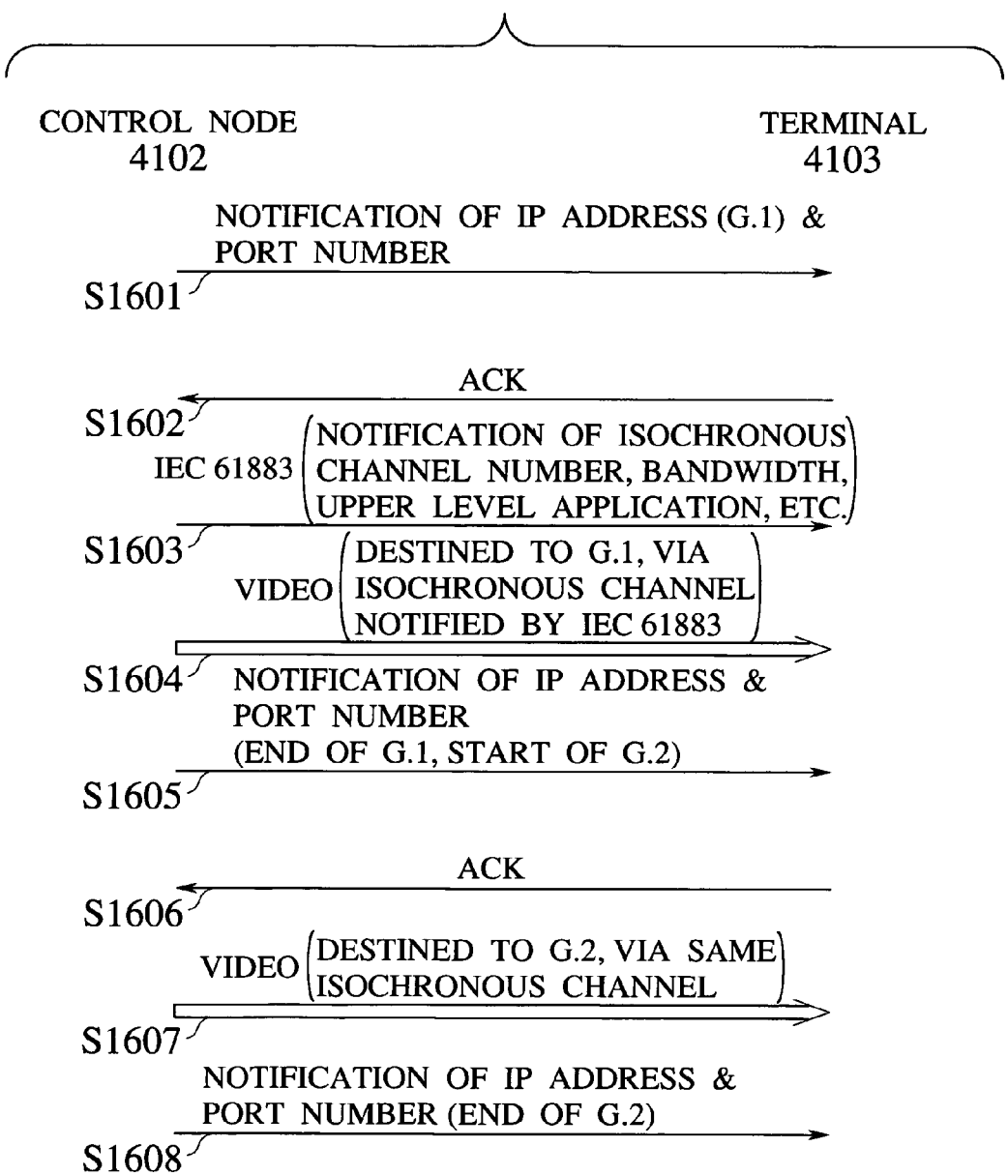
FIG. 31 is a sequence chart for another procedure to notify IP address and port number from a control node to a terminal in the system of FIG. 26.

FIG. 31 corresponds to a sequence after the communication resource reservation by the control node 4102 and the terminal 4103 of FIG. 30, where steps S1504, S1505, S1506 and S1509 of FIG. 30 correspond to steps S1601, S1602, S1603 and S1604 of FIG. 31, respectively.

Now, at this point, when there is a change of a destination IP address of IP packets to be transferred (such as a change of IP multicast address in conjunction with a change of program for example) or a change of a port number, for example, such a situation is handled by interrupting the receiving of IP packets with IP address and port number used up until then and notifying a new IP packet attribute (IP address, port number, etc.) to be received from now on, with respect to the terminal 4103 (steps S1605 and S1606 of FIG. 31). By means of this provision, it becomes possible for the terminal 4103 to carry out the receiving of new IP packet group (step S1607 of FIG. 31).

Also, in a case of ending the receiving of the above described IP packet group, this can be done by sending a notification for ending IP packet receiving at these IP address and port number from the control node 4102 to the terminal 4103 at the step S1608.

As such, a series of IP address and port number notification protocol has a feature common to the DHCP protocol (Dynamic Host Configuration Protocol) of Internet which is used to make an order of "use these IP addresses temporarily". For this reason, it is also possible to implement this IP address and port number notification protocol as an option to the DHCP.

Figure 32:
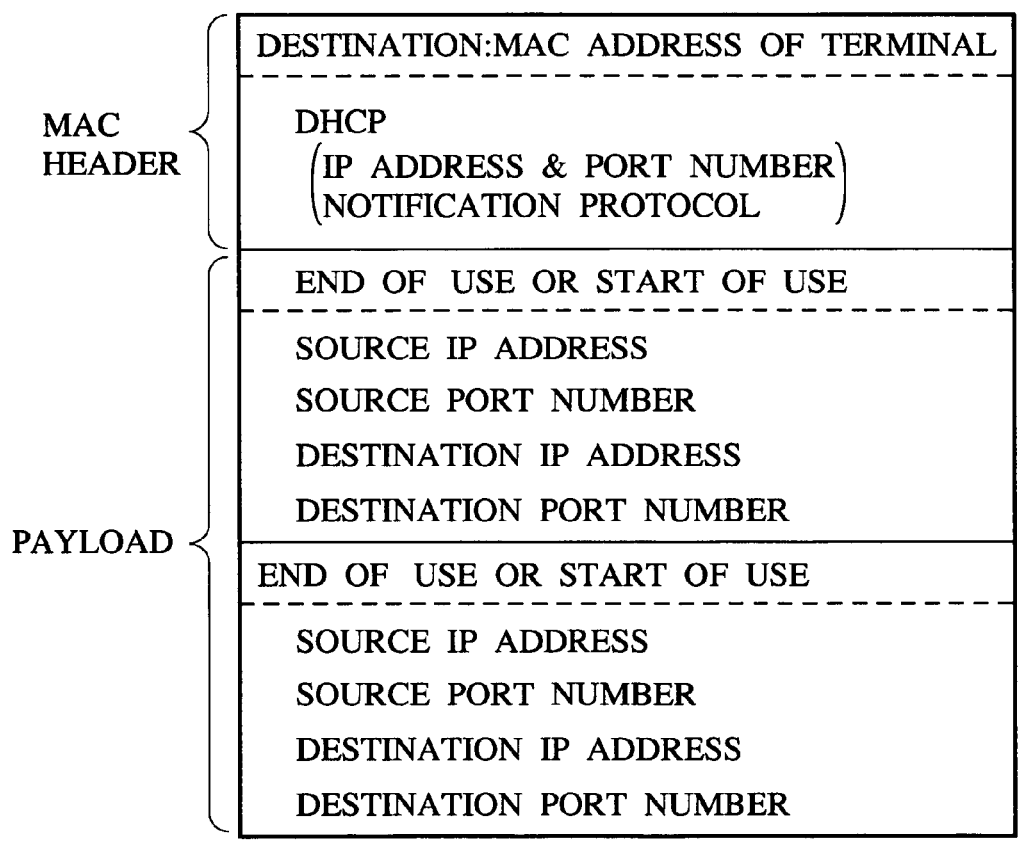
FIG. 32 is a diagram showing an exemplary DHCP packet that can be used for notifying IP address and port number from a control node to a terminal in the system of FIG. 26.

Namely, as shown in FIG. 32, an option field for indicating whether it is to be used as a packet for the IP address and port number notification protocol or not is provided in a DHCP packet, and IP address, port number and the like that are to be used is described therein. If necessary, there can be also a region for describing IP address, port number and the like that is to be stopped from being used. In addition, for each of these IP address and port number, there can be also a field for indicating whether it is urging the start of use of that attribute or the end of use of that attribute.

Moreover, in a case of IEEE 1394, the terminal may be formed to have a dedicated register for the purpose of exchanging these information. In that case, data of a payload region in FIG. 32 are going to be written into or read out from that particular register.

It is to be noted that the above description is equally applicable to IPv4 which is the currently used IP as well as to IPv6.

In addition, it should be apparent that the scheme of the fourth embodiment can also be used in a case of transferring a specific IP multicast address in an arbitrary asynchronous stream of IEEE 1394, for a notification of correspondence between that IP multicast address and a channel number of the asynchronous stream. Namely, the scheme of the fourth embodiment can be used exactly as described above in reserving a channel and notifying a correspondence between its channel umber and an IP multicast address to be transferred through that channel.

Moreover, it is also possible to apply the scheme of the fourth embodiment to a case which does not require the reservation of communication resource in the datalink layer, as in a case of notification of data flow to be received to a temporarily used receiving terminal in Ethernet. In such a case, a sequence for reserving communication resource in IEEE 1394 is to be omitted and a usual MAC address is to be used as the communication resource instead, and thereafter the notified data flow is going to be transferred through frames destined to this MAC address.

It is also to be noted that the scheme of the fourth embodiment has been described above for an exemplary case where a communication device (terminal) has network layer address different from the notified network layer address, but it is also possible to apply this scheme of the fourth embodiment to a case where a communication device (terminal) does not originally have any network address. In such a case, a destination IP address and a destination port number to be received, as well as a source IP address, a source port number, etc., if necessary, are going to be notified to the communication device by using IEEE 1394 message or by means of writing into IEEE 1394 register.

As described, the scheme of the fourth embodiment adopts a provision in which an information on IP flow to be received is given to the terminal, and only the receiving of that IP flow is required temporarily to the terminal, so that it suffices for the terminal to implement only the receiving function out of the complicated IP processing function, and therefore considerable simplification and cost reduction for the terminal configuration can be realized.

As a result, it is possible to resolve the problem that the implementation of the full IP processing function is redundant for many home electronic appliances.

As described, according to the present invention, it becomes possible for the dedicated IEEE 1394 terminal to carry out communications with a group of nodes which are operated by the protocol other than the IEEE 1394, and it also becomes possible to inter-connect the IEEE 1394 buses through a physical network other than the IEEE 1394 bus.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A relay device for transmitting and receiving contents between at least one terminal device connected to a first network and at least one terminal device connected to a second network, the relay device being connected to the first network and the second network and comprising:
   a first collection unit configured to collect an address and attribute information of each terminal device connected to the first network, by inquiring at least one of a type of the each terminal device and the contents possessed by the each terminal device, and the attribute information containing the address of the each terminal device;
   a second collection unit configured to collect the address and the attribute information of each terminal device connected to the second network, by inquiring at least one of a type of the each terminal device and the contents possessed by the each terminal device, and the attribute information containing the address of the each terminal device;
   a memory unit configured to store the address and the attribute information of each terminal device on the first network and the second network collected by the first collection unit and the second collection unit;
   a display control unit configured to enable display of information stored in the memory unit;
   a first set up unit configured to set up a connection on the first network for transmitting contents to be transmitted from a transmitting terminal which is a terminal device on the first network to a receiving terminal which is a terminal device on the second network, upon receiving a request for transmission of the contents possessed by the transmitting terminal from the transmitting terminal to the receiving terminal, the transmitting terminal and the receiving terminal being selected according to the display of information enabled by the display control unit;
   a second set up unit configured to set up a channel on the second network for transmitting the contents to be transmitted from the transmitting terminal;
   a reception unit configured to receive the contents transmitted from the transmitting terminal by using the connection; and
   a transmission unit configured to transmit the contents received by the reception unit to the receiving terminal by using the channel.

2. The relay device of claim 1, further comprising:
a display unit configured to display the information stored in the memory unit according to the display control unit.

3. The relay device of claim 1, further comprising:
a decoding unit configured to decode encoded contents received by the reception unit, wherein the transmission unit transmits the contents decoded by the decoding unit to the receiving terminal by using the channel.

4. The relay device of claim 1, wherein the first network is an IEEE 1394 bus, and the channel is an IEEE 1394 isochronous transfer channel.

5. The relay device of claim 4, wherein the IEEE 1394 bus that constitutes the first network is formed by bridge connections of a plurality of IEEE 1394 buses.

6. The relay device of claim 1, further comprising:
a command unit configured to command the transmitting terminal to transmit the contents by using the connection, when the channel is set up on the second network by the second set up unit according to a control message received by the relay device, the control message containing at least information regarding a required amount of communication resources at a time of transmitting the contents on the second network and a header information to be attached to the contents, in order to set up the channel on the second network.

7. The relay device of claim 1, wherein the request for transmission of the contents possessed by the transmitting terminal is made by a request message containing information for identifying the transmitting terminal such that the transmission of the contents is commanded to the transmitting terminal identified by this information.

8. The relay device of claim 1, further comprising:
a command unit configured to command the receiving terminal device to receive the contents to be transmitted by using the channel when the channel is set up by the second set up unit.

9. The relay device of claim 1, wherein the second network is an IEEE 1394 bus, and the channel is an IEEE 1394 isochronous transfer channel.

10. The relay device of claim 9, wherein the IEEE 1394 bus that constitutes the second network is formed by bridge connections of a plurality of IEEE 1394 buses.

11. A method for controlling a relay device for transmitting and receiving contents between at least one terminal device connected to a first network and at least one terminal device connected to a second network, the relay device being connected to the first network and the second network and the method comprising:

collecting an address and attribute information of each terminal device connected to the first network, by inquiring at least one of a type of the each terminal device and the contents possessed by the each terminal device, and the attribute information containing the address of the each terminal device;

collecting the address and the attribute information of each terminal device connected to the second network, by inquiring at least one of a type of the each terminal device and the contents possessed by the each terminal device, and the attribute information containing the address of the each terminal device;

storing the address and the attribute information of each terminal device on the first network and the second network collected by the collecting steps in a memory;

enabling display of information stored in the memory;

setting up a connection on the first network for transmitting contents to be transmitted from a transmitting terminal which is a terminal device on the first network to a receiving terminal which is a terminal device on the second network, upon receiving a request for transmission of the contents possessed by the transmitting terminal from the transmitting terminal to the receiving terminal, the transmitting terminal and the receiving terminal being selected according to the display of information enabled by the enabling step;

setting up a channel on the second network for transmitting the contents to be transmitted from the transmitting terminal;

receiving the contents transmitted from the transmitting terminal by using the connection; and transmitting the contents received by the receiving step to the receiving terminal by using the channel.

* * * * *